US012455665B2

(12) United States Patent
Jeong et al.

(10) Patent No.: US 12,455,665 B2
(45) Date of Patent: Oct. 28, 2025

(54) DISPLAY DEVICE

(71) Applicant: Samsung Display Co., Ltd., Yongin-Si (KR)

(72) Inventors: Hwan-Hee Jeong, Yongin-si (KR); Sungkyun Park, Yongin-si (KR); Soyeon Park, Yongin-si (KR); Giryung Lee, Yongin-si (KR); Hyeyun Han, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/637,456

(22) Filed: Apr. 17, 2024

(65) Prior Publication Data
US 2025/0053267 A1 Feb. 13, 2025

(30) Foreign Application Priority Data
Aug. 11, 2023 (KR) .......................... 10-2023-0105707

(51) Int. Cl.
*G06F 3/044* (2006.01)
(52) U.S. Cl.
CPC .. *G06F 3/0446* (2019.05); *G06F 2203/04111* (2013.01); *G06F 2203/04112* (2013.01)
(58) Field of Classification Search
CPC .... G06F 3/0412; G06F 3/0446; G06F 3/0443; G06F 2203/04112; G06F 2203/04111
See application file for complete search history.

(56) References Cited

U.S. PATENT DOCUMENTS

| 11,320,950 B2 | 5/2022 | Na et al. |
| 11,604,524 B2 | 3/2023 | Kim et al. |
| 11,762,519 B2 | 9/2023 | Bo et al. |
| 2020/0019294 A1* | 1/2020 | Lee ........................ G06F 3/0412 |
| 2020/0110499 A1* | 4/2020 | Lee ........................ G06F 3/0412 |

(Continued)

FOREIGN PATENT DOCUMENTS

| KR | 10-2021-0105467 A | 8/2021 |
| KR | 10-2348106 B1 | 1/2022 |

*Primary Examiner* — Deeprose Subedi
(74) *Attorney, Agent, or Firm* — Innovation Counsel LLP

(57) ABSTRACT

A display device is disclosed that includes a display panel and an input sensor including a plurality of conductive patterns. The conductive patterns include a first sensing electrode including first sensing patterns and bridge patterns, a second sensing electrode spaced apart from the first sensing electrode, and dummy patterns each overlapping the second sensing electrode and a first sensing pattern adjacent to the second sensing electrode in the first direction. Each of the bridge patterns is connected to two first sensing patterns through first contact holes. When a region, in which each of the plurality of dummy patterns overlaps each of the corresponding first sensing pattern and the second sensing electrode, is defined as an overlapping region, a dummy hole, which passes through a conductive pattern disposed on an upper part among the corresponding first sensing pattern, the second sensing electrode, and the plurality of dummy patterns, in a thickness direction, is defined in the overlapping region. Each of the bridge patterns is disposed between two dummy patterns in the second direction. Distances between the two dummy patterns and the bridge pattern, disposed between the two dummy patterns, are uniform in the second direction.

20 Claims, 17 Drawing Sheets

(56) References Cited

U.S. PATENT DOCUMENTS

2022/0334678 A1 10/2022 Long
2023/0236694 A1* 7/2023 Lin .................... G06F 3/04164
　　　　　　　　　　　　　　　　　　　　345/173

* cited by examiner

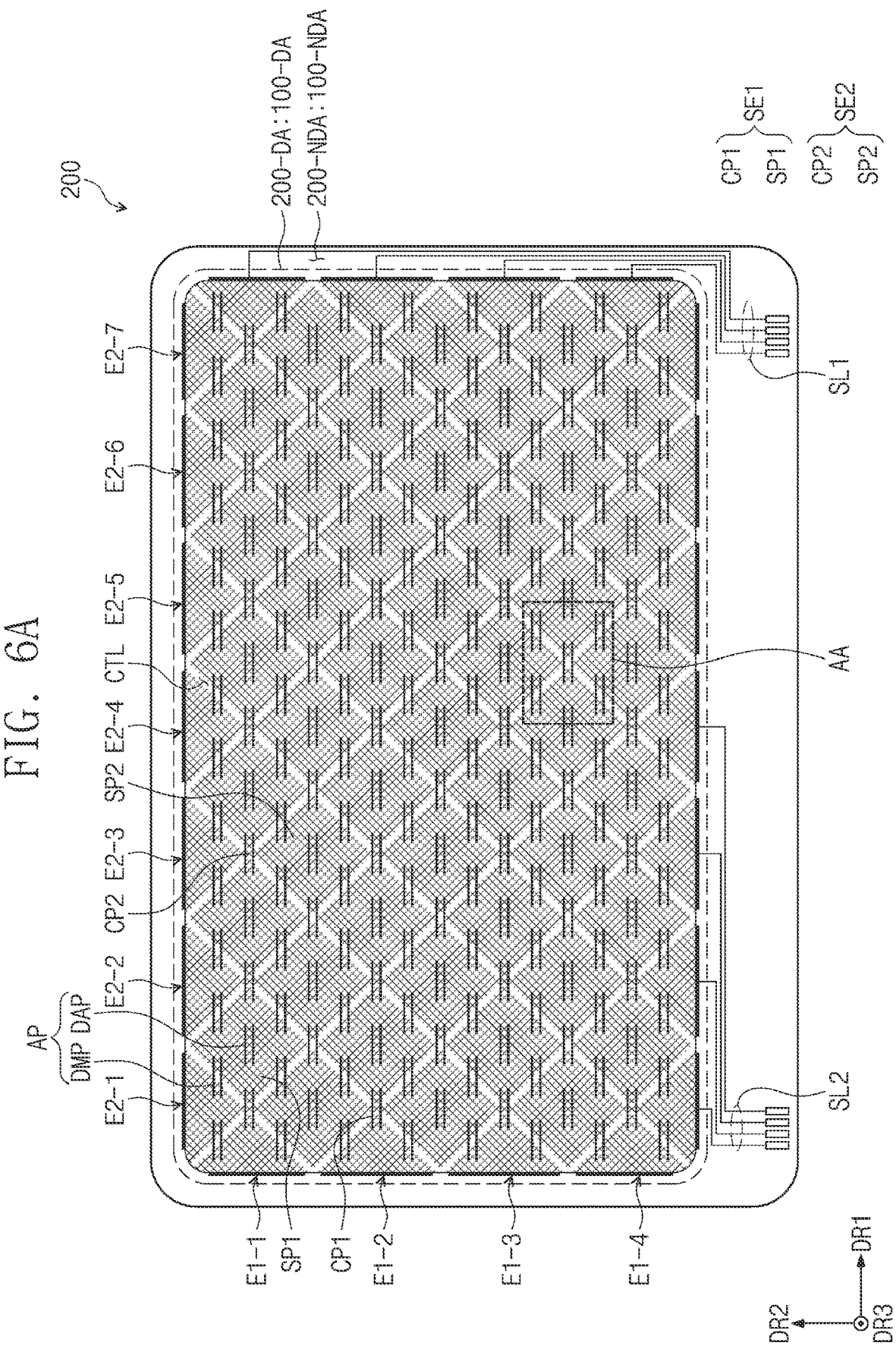

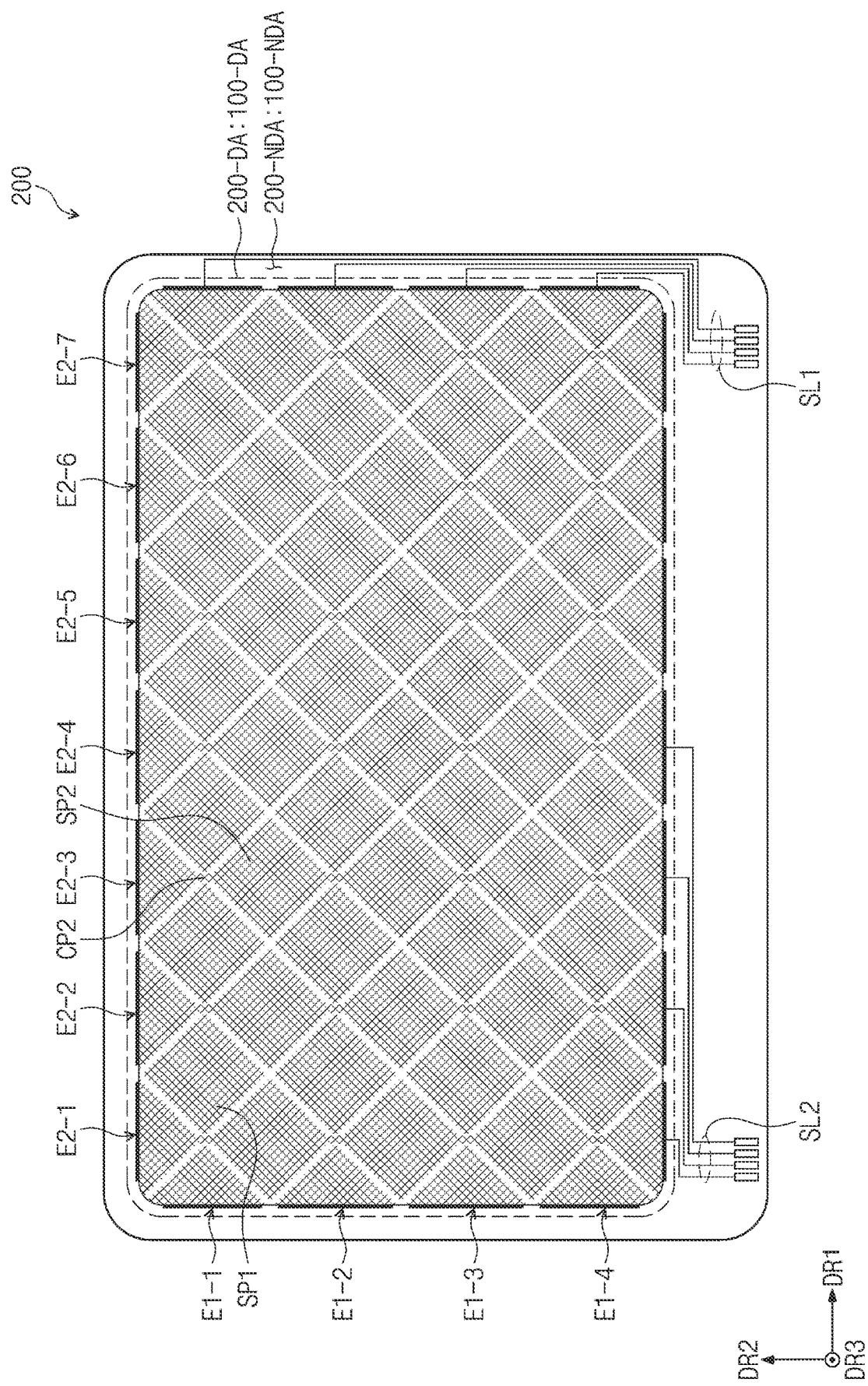

DISPLAY DEVICE

CROSS-REFERENCE TO RELATED APPLICATIONS

This U.S. non-provisional patent application claims priority under 35 U.S.C. § 119 of Korean Patent Application No. 10-2023-0105707, filed on Aug. 11, 2023, the entire contents of which are hereby incorporated by reference.

BACKGROUND

The present disclosure relates to a display device.

Multimedia apparatuses, such as televisions, mobile phones, tablet computers, navigation systems, and game consoles, include display devices that display images to users through display screens. A display device may include a display panel that generates the image, and an input sensor that detects a user's touch.

An input sensor may be disposed on a display panel and include a conductor that detects an external input. The conductor may affect emission efficiency of the display device or affect reflectance of external light from the display device.

SUMMARY

The present disclosure provides a display device with improved visibility.

An embodiment of a display device includes a display panel having a plurality of light-emitting regions, and an input sensor disposed on the display panel and including a plurality of conducive patterns, wherein the plurality of conductive patterns include a first sensing electrode including a plurality of first sensing patterns provided along a first direction, and a plurality of bridge patterns connecting adjacent first sensing patterns, a second sensing electrode spaced apart from the first sensing electrode and including a plurality of second sensing patterns extending along a second direction crossing the first direction, and a plurality of dummy patterns each overlapping, on a plane, the second sensing electrode and a first sensing pattern adjacent to the second sensing electrode in the first direction, each of the plurality of bridge patterns is connected to two first sensing patterns through first contact holes, when a region, in which each of the plurality of dummy patterns overlaps each of the corresponding first sensing pattern and the second sensing electrode, is defined as an overlapping region, a dummy hole, which passes through a conductive pattern disposed on an upper part among the corresponding first sensing pattern, the second sensing electrode, and the plurality of dummy patterns, in a thickness direction, is defined in the overlapping region, each of the plurality of bridge patterns is disposed between two dummy patterns among the plurality of dummy patterns in the second direction, and distances between the two dummy patterns and the bridge pattern, disposed between the two dummy patterns, are uniform in the second direction.

In an embodiment, the dummy hole may include a first dummy hole defined in a region where each of the plurality of dummy patterns overlaps the second sensing electrode, or a second dummy hole defined in a region where each of the plurality of dummy patterns overlaps the corresponding first sensing pattern.

In an embodiment, each of the plurality of dummy patterns may be connected, through a second contact hole, to any one not overlapping the dummy hole among the corresponding first sensing pattern and the second sensing electrode.

In an embodiment, the plurality of conductive patterns may further include at least one additional dummy pattern overlapping any one among the corresponding first sensing pattern and the second sensing electrode, and not overlapping the other one.

In an embodiment, when a region, in which the additional dummy pattern overlaps any one among the corresponding first sensing pattern and the second sensing electrode, is defined as an additional overlapping region, an additional dummy hole, which passes through a conductive pattern disposed on an upper part, among the first corresponding sensing pattern, the second sensing electrode, and the additional dummy pattern, in a thickness direction, may be defined in the additional overlapping region.

In an embodiment, the first contact hole, the dummy hole, and the additional dummy hole may be arranged at regular intervals in the first direction and the second direction.

In an embodiment, the additional dummy pattern may be electrically connected, through a third contact hole, to any one overlapping therewith among the corresponding first sensing pattern and the second sensing electrode.

In an embodiment, a distance between two dummy patterns adjacent to each other in the first direction, among the plurality of dummy patterns, may be substantially same as a distance between any one among the plurality of bridge patterns and the additional dummy pattern adjacent thereto in the first direction.

In an embodiment, the plurality of bridge patterns may include a first bridge pattern which connects a corresponding (1-1)-th sensing pattern and a (1-2)-th sensing pattern to each other among the plurality of first sensing patterns, and the first bridge pattern may include a (1-1)-th bridge pattern which connects the (1-1)-th sensing pattern to the (1-2)-th sensing pattern, and a (1-2)-th bridge pattern which is spaced apart from the (1-1)-th bridge pattern along the second direction, and connects the (1-1)-th sensing pattern to the (1-2)-th sensing pattern.

In an embodiment, the plurality of dummy patterns may include a first dummy pattern disposed between the (1-1)-th bridge pattern and the (1-2)-th bridge pattern in the second direction, and a distance between the (1-1)-th bridge pattern and the first dummy pattern in the second direction may be substantially same as a distance between the (1-2)-th bridge pattern and the first dummy pattern in the second direction.

In an embodiment, a boundary part may be defined between the first sensing electrode and the second sensing electrode, and a portion of each of the plurality of dummy patterns may overlap the boundary part.

In an embodiment, a length of each of the plurality of bridge patterns in the first direction is substantially same as a length of each of the plurality of dummy patterns in the first direction.

In an embodiment, a first length of each of the plurality of bridge patterns in the first direction may be larger than a second length of each of the plurality of dummy patterns in the first direction.

In an embodiment, when a region, in which each of the plurality of bridge patterns overlaps each of the two first sensing patterns, is defined as a bridge overlapping region, a bridge dummy hole, which passes through a conductive pattern disposed on an upper part, among the two first sensing patterns and the plurality of bridge patterns, in a thickness direction, may be defined in the bridge overlapping region.

In an embodiment, the input sensor may further include a sensing insulation layer disposed between the plurality of bridge patterns and the first sensing pattern, and the first contact hole may pass through the sensing insulation layer.

In an embodiment, the input sensor may further include a sensing insulation layer disposed between the plurality of bridge patterns and the first sensing pattern, and the dummy hole may expose an upper surface of the sensing insulation layer.

In an embodiment, each of the plurality of first sensing patterns and the plurality of second sensing patterns may include a plurality of mesh lines defining a plurality of openings respectively overlapping the plurality of light-emitting regions, the plurality of mesh lines may include a first mesh line having a first thickness, and a second mesh line having a second thickness larger than the first thickness, and each of the first contact hole and the dummy hole may overlap the second mesh line.

In an embodiment, the plurality of light-emitting regions may include a first light-emitting region configured to emit first color light, a second light-emitting region configured to emit second color light different from the first color light, and a third light-emitting region configured to emit third color light different from the first color light and the second color light, the first light-emitting region and the second light-emitting region may be alternately arranged along the second direction, the third light-emitting region may be arranged apart from the first light-emitting region and the second light-emitting region along the first direction, and each of the first contact hole and the dummy hole may overlap the third light-emitting region in the second direction.

An embodiment of a display device includes a display panel including a plurality of light-emitting regions, and an input sensor disposed on the display panel and including a plurality of conductive patterns. The plurality of conductive patterns include a first sensing electrode including a plurality of first sensing patterns provided along a first direction, and a plurality of bridge patterns connecting adjacent first sensing patterns, a second sensing electrode spaced apart from the first sensing electrode and including a plurality of second sensing patterns extending along a second direction crossing the first direction, a plurality of dummy patterns each overlapping, on a plane, the second sensing electrode and a first sensing pattern adjacent to the second sensing electrode, and an additional dummy pattern overlapping the first sensing pattern or the second sensing electrode. Each of the plurality of bridge patterns is connected to two first sensing patterns through first contact holes. When a region, in which each of the plurality of dummy patterns overlaps each of the corresponding first sensing pattern and the second sensing electrode, is defined as an overlapping region, a first hole, which passes through a conductive pattern disposed on an upper part among the corresponding first sensing pattern, the second sensing electrode, and the plurality of dummy patterns, being recessed in a thickness direction, is defined in the overlapping region. The first sensing pattern or the second sensing electrode includes second dummy holes that overlap the additional dummy pattern. The first contact hole, the first hole, and the second holes are arranged at regular intervals in the first direction and the second direction.

An embodiment of a display device includes a display panel including a plurality of light-emitting regions, and an input sensor disposed on the display panel, and including a plurality of conductive patterns. The plurality of conductive patterns include a first sensing electrode having a (1-1)-th sensing pattern and a (1-2)-th sensing pattern provided along a first direction, and a first bridge pattern connecting the (1-1)-th sensing pattern to the (1-2)-th sensing pattern, a second sensing electrode spaced apart from the first sensing electrode, and having a (2-1)-th sensing pattern and a (2-2)-th sensing pattern provided along a second direction crossing the first direction, and a connection pattern having an integrated form with each of the (2-1)-th sensing pattern and the (2-2)-th sensing pattern, and a first dummy pattern overlapping each of the (1-1)-th sensing pattern and the connection pattern on a plane. The first bridge pattern is connected to each of the (1-1)-th sensing pattern and the (1-2)-th sensing pattern through first contact holes, and when a region, in which the first dummy pattern overlaps each of the (1-1)-th sensing pattern and the connection pattern, is defined as an overlapping region, the overlapping region includes a dummy hole passing through a conductive pattern disposed on an upper part, among the (1-1)-th sensing pattern, the connection pattern, and the first dummy pattern, in a thickness direction.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIG. 6A is a plan view of an input sensor according to an embodiment of the inventive concept;

FIGS. 6B and 6C are plan views illustrating a partial configuration of an input sensor according to an embodiment of the inventive concept;

DETAILED DESCRIPTION

Figure 1:
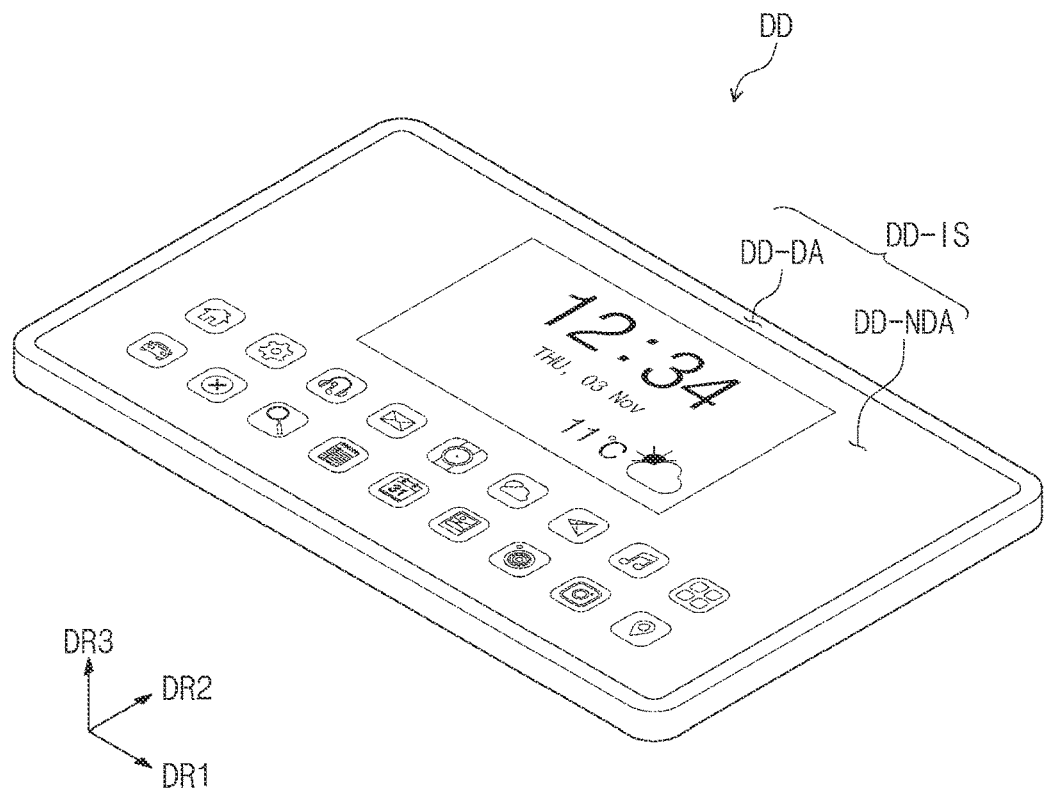
FIG. 1 is a perspective view of a display device according to an embodiment of the inventive concept.

In this specification, it will be understood that when an element (or a region, a layer, a portion, or the like) is referred to as being "on", "connected to" or "coupled to" another element, it may be directly disposed on, connected or coupled to the other element, or intervening elements may be disposed therebetween.

When an element (a layer, film, region, substrate, or the like) is referred to as being "directly disposed" on another element, there are no intervening layer, film, region, or substrate present therebetween. For example, being "directly disposed" may refer to being disposed without using an additional member such as an adhesive member between two layers or members.

Like reference numerals or symbols refer to like elements throughout. In the drawings, the thickness, the ratio, and the size of the element are exaggerated for effective description of the technical contents. As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

It will be understood that, although the terms first, second, etc. may be used herein to describe various elements, components, regions, layers or sections, these elements, components, regions, layers or sections should not be limited by these terms. These terms are only used to distinguish one element, component, region, layer or section from another element, component, region, layer or section. Thus, a first element, component, region, layer or section discussed below could be termed a second element, component, region, layer or section without departing from the scope of the inventive concept. Similarly, a second element, component, region, layer or section may be termed a first element, component, region, layer or section. As used herein, the singular forms, "a", "an" and "the" are intended to include the plural forms as well, unless the context clearly indicates otherwise.

Also, terms of "below", "on lower side", "above", "on upper side", or the like may be used to describe the relationships of the elements illustrated in the drawings. These terms have relative concepts and are described on the basis of the directions indicated in the drawings.

It will be further understood that the terms "comprises," "includes," and "have" (as well as their variations such as "comprising"), when used in this specification, specify the presence of stated features, integers, steps, operations, elements, components, or groups thereof, but do not preclude the presence or addition of one or more other features, integers, steps, operations, elements, components, or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the inventive concept are described with reference to the accompanying drawings.

FIG. 1 is a perspective view of a display device DD according to an embodiment of the inventive concept. As illustrated in FIG. 1, the display device DD may display an image through a display surface DD-IS. The display surface DD-IS may have a rectangular shape, on a plane, having long sides extending in a first direction DR1 and short sides extending in a second direction DR2 crossing the first direction DR1. However, an embodiment of the inventive concept is not limited thereto, and the display surface DD-IS may have various shapes such as circle or polygon.

A third direction DR3 is defined as a direction substantially perpendicular to a plane defined by the first direction DR1 and the second direction DR2. A front surface (or upper surface) and a rear surface (or lower surface) of each of members constituting the display device DD are substantially opposed to each other in the third direction DR3, and the normal direction of each of the front surface and the rear surface is substantially parallel to the third direction DR3. The distance between the front surface and the rear surface, defined on the basis of the third direction DR3, corresponds to the thickness of the member.

"On a plane" is defined as a state of being viewed from the third direction DR3. That is, "on a plane" may be described on the basis of the plane defined by the first direction DR1 and the second direction DR2 together. In this specification, "on a cross-section" may be defined as a state of being viewed from the first direction DR1 or the second direction DR2.

According to an embodiment of the inventive concept, the display device DD having a flat display surface is illustrated, but an embodiment of the inventive concept is not limited thereto. The display device DD may include a curved display surface or a three-dimensional display surface. The three-dimensional display surface may include a plurality of display regions indicating different directions, for example, include a bent display surface. The display device DD according to this embodiment may be a flexible display device DD. The flexible display device DD may be a foldable display device capable of folding.

In FIG. 1, the display device DD applicable to a tablet computer is exemplarily illustrated. Electronic modules mounted on a main board, a camera module, a power module, and the like, may be disposed in a bracket/case, etc. together with the display device DD, thereby constituting the tablet computer. The display device DD according to an embodiment of the inventive concept may be applied not only to a large electronic apparatus such as a television and a monitor, but also to a small to medium-sized electronic apparatus such as a mobile phone, a car navigation system, a game console, and a smart watch.

The display surface DD-IS includes an image region DD-DA in which an image is displayed, and a bezel region DD-NDA adjacent to the image region DD-DA. The bezel region DD-NDA is a region in which the image is not displayed. FIG. 1 illustrates icon images as an example of the image.

As illustrated in FIG. 1, the image region DD-DA may have substantially a quadrilateral shape. "Substantially the quadrilateral shape" includes not only a quadrilateral shape in mathematical meaning, but also a quadrilateral shape in which a curved border, not a vertex, is defined in the vertex region (or corner region).

The bezel region DD-NDA may surround the image region DD-DA. However, an embodiment of the inventive concept is not limited thereto, and the shape of the bezel region DD-NDA may be changed. For example, the bezel region DD-NDA may be disposed only on one side of the image region DD-DA.

Figure 2:
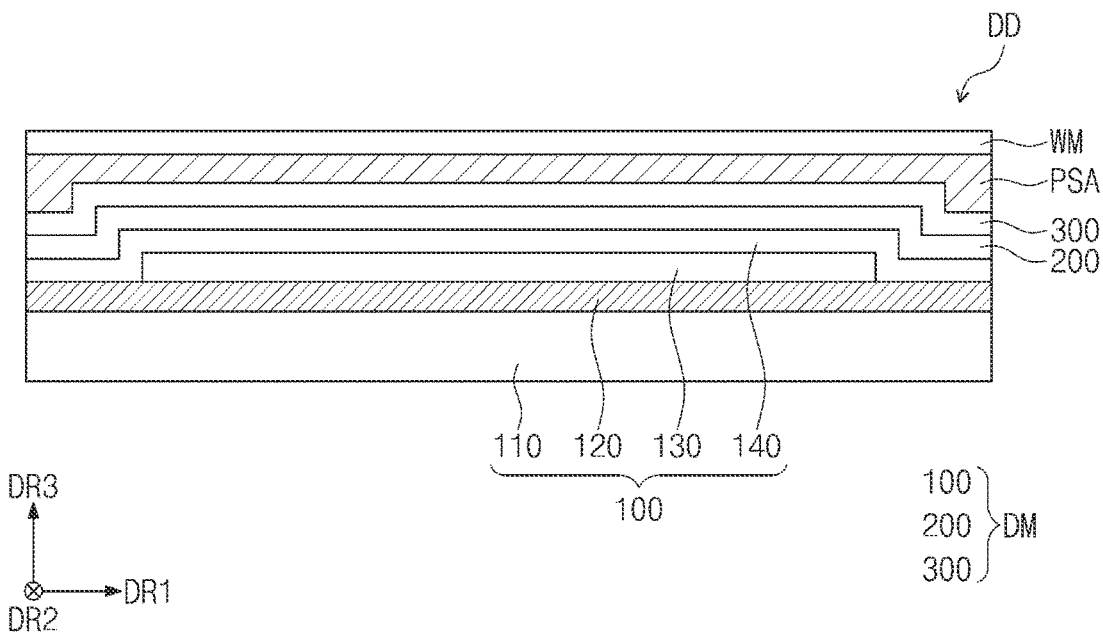
FIG. 2 is a cross-sectional view of a display device according to an embodiment of the inventive concept.

FIG. 2 is a cross-sectional view of a display device DD according to an embodiment of the inventive concept.

The display device DD may include a display module DM and a window WM disposed on the display module DM. The display module DM and the window WM may be bonded to each other by an adhesion layer PSA. According to an embodiment of the inventive concept, the window WM may be formed through coating, the window WM may be in contact with the display module DM and the adhesion layer PSA may be omitted.

The display module DM may include a display panel 100, an input sensor 200, and an anti-reflection layer 300. The display panel 100 may include a base layer 110, a driving element layer 120, a light-emitting element layer 130, and an encapsulation layer 140.

The driving element layer 120 is disposed on an upper surface of the base layer 110. The base layer 110 may be a flexible substrate capable of bending, folding, rolling, etc. The base layer 110 may be a glass substrate, a metal substrate, or a polymer substrate. However, an embodiment of the inventive concept is not limited thereto, and the base layer 110 may be an inorganic layer, an organic layer, or a composite material layer. Substantially, the base layer 110 has the same shape as that of the display panel 100.

The base layer 110 may have a multi-layer structure. For example, the base layer 110 may include a first synthetic resin layer, a second synthetic resin layer, and inorganic layers disposed therebetween. Each of the first and second synthetic resin layers may include a polyimide-based resin, and an embodiment of the inventive concept is not limited particularly thereto.

The driving element layer 120 may be disposed on the base layer 110. The driving element layer 120 may include a plurality of insulation layers, a plurality of semiconductor patterns, a plurality of conductive patterns, and signal lines. The driving element layer 120 may include a driving circuit of a pixel.

The light-emitting element layer 130 may be disposed on the driving element layer 120. The light-emitting element layer 130 may include a light-emitting element. For example, the light-emitting element may include an organic light-emitting material, an inorganic light-emitting material, an organic-inorganic light-emitting material, quantum dots, quantum rods, a micro LED, or a nano LED.

The encapsulation layer 140 may be disposed on the light-emitting element layer 130. The encapsulation layer 140 may protect the light-emitting element layer 130, that is, the light-emitting element, from moisture, oxygen, and foreign substances such as dust particles. The encapsulation layer 140 may include at least one inorganic encapsulation layer. The encapsulation layer 140 may include a stacked structure of a first inorganic encapsulation layer/an organic encapsulation layer/a second inorganic encapsulation layer.

The input sensor 200 may be directly disposed on the display panel 100. The input sensor 200 may detect a user's input, for example, in an electromagnetic or capacitive manner. The display panel 100 and the input sensor 200 may be formed through a continuous process. Herein, "to be directly disposed" may mean that there is no intervening component disposed between the input sensor 200 and the display panel 100. For example, there may be no additional adhesion layer disposed between the input sensor 200 and the display panel 100.

The anti-reflection layer 300 reduces the reflectance for external light incident from above the window WM. The anti-reflection layer 300 according to an embodiment of the inventive concept may include a retarder and a polarizer. The retarder may be a film type or a liquid crystal coating type, and include λ/2 retarder or λ/4 retarder. The polarizer may also be a film typed or a liquid crystal coating type. The film type may include a stretchable synthetic resin film, and the liquid crystal coating type may include liquid crystals arranged in a predetermined arrangement. The retarder and the polarizer may further include a protection film. The retarder and the polarizer itself or the protection film may be defined as a base layer of the anti-reflection layer 300.

The anti-reflection layer 300 according to an embodiment of the inventive concept may include color filters. The color filters have a predetermined arrangement. The arrangement of the color filters may be determined in consideration of emission colors of pixels included in the display panel 100. The anti-reflection layer 300 may further include a black matrix adjacent to the color filters. The anti-reflection layer 300 including the color filters may be directly disposed on the display panel 100.

The window WM according to an embodiment of the inventive concept may include a base layer and a light-blocking pattern. The base layer may include a glass substrate or a synthetic resin film, etc. The light-blocking pattern partially overlaps the base layer WP-BS. The light-blocking pattern may be disposed on a rear surface of the base layer, and the light-blocking pattern may substantially define the bezel region DD-NDA (see FIG. 1) of the display device DD. A region where the light-blocking pattern is not disposed may define the image region DD-DA (see FIG. 1) of the display device DD.

Figure 3:
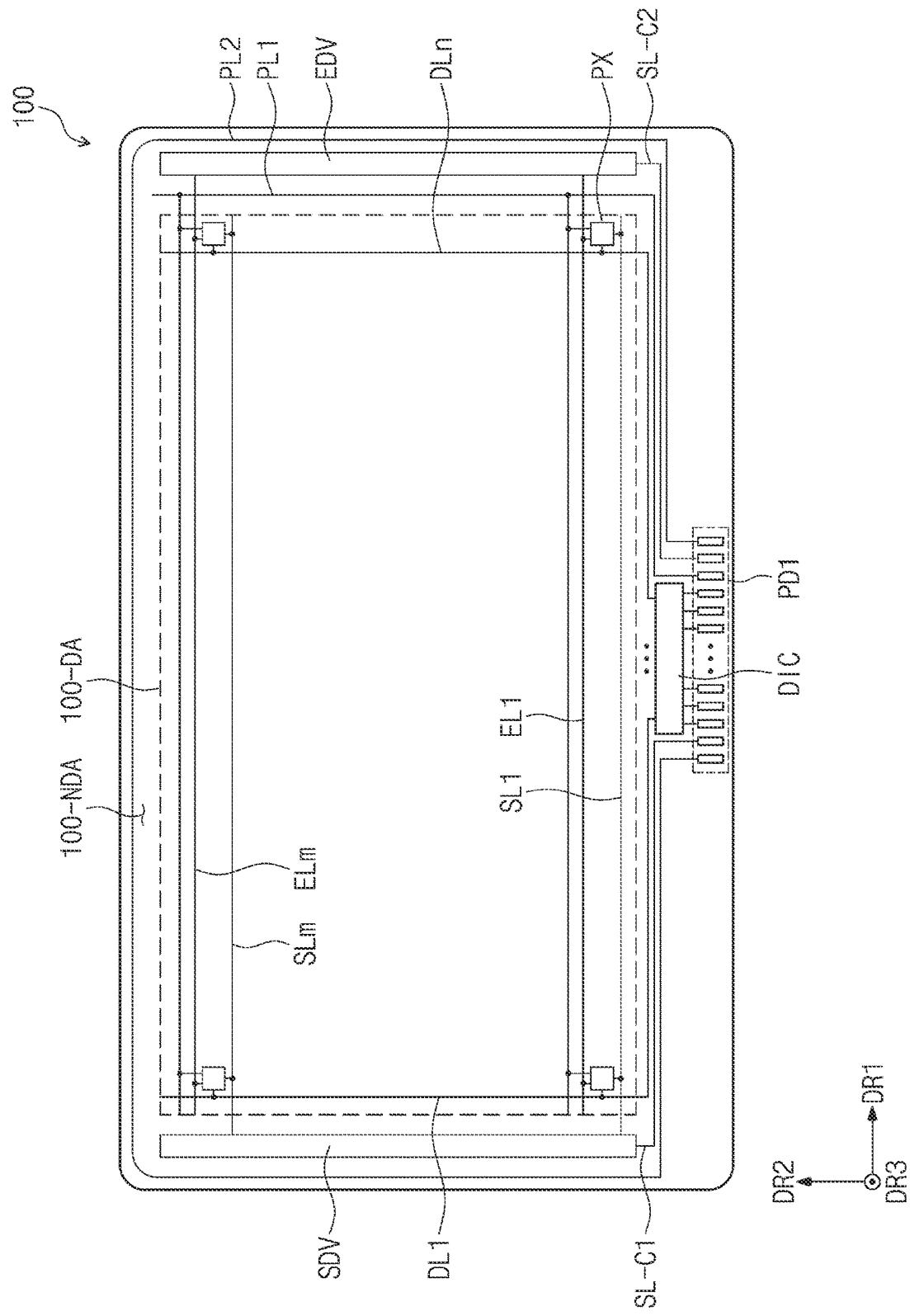
FIG. 3 is a plan view of a display panel according to an embodiment of the inventive concept.

FIG. 3 is a plan view of a display panel 100 according to an embodiment of the inventive concept.

Referring to FIG. 3, the display panel 100 may include a plurality of pixels PX, a scan driving circuit SDV, an emission driving circuit EDV, a plurality of signal lines, and a plurality of pads PD1. The plurality of pixels PX are disposed in a display region 100-DA. A driving chip DIC mounted on a non-display region 100-NDA may include a data driving circuit. The display region 100-DA may correspond to the image region DD-DA of FIG. 1, and the non-display region 100-NDA may correspond to a bezel region DD-NDA. In this specification, "a region or portion corresponding to a region or portion" means the region or portion overlapping the region or portion, and is not necessarily limited to two different regions or portions having the same area. According to an embodiment of the inventive concept, the data driving circuit, like the scan driving circuit SDV and the emission driving circuit EDV, may also be integrated into the display panel 100.

The plurality of signal lines may include a plurality of scan lines SL1 to SLm, a plurality of data lines DL1 to DLn, a plurality of emission lines EL1 to ELm, first and second control lines SL-C1 and SL-C2, and first and second power lines PL1 and PL2. m and n are natural numbers of at least 2.

The scan lines SL1 to SLm may extend in a first direction DR1 to be electrically connected to the pixels PX and the scan driving circuit SDV. The data lines DL1 to DLn may extend in a second direction DR2 to be electrically connected to the pixels PX and the driving chip DIC. The emission lines EL1 to ELm may extend in the first direction DR1 to be electrically connected to the pixels PX and the emission driving circuit EDV.

The first power line PL1 receives a first power voltage, and the second power line PL2 receives a second power voltage having a lower level than that of the first power voltage. Although not illustrated in the drawing, a second electrode (for example, cathode) of a light-emitting element is connected to the second power line PL2.

The first control line SL-C1 may be connected to the scan driving circuit SDV, and extend toward a lower end of the display panel 100. The second control line SL-C2 may be connected to the emission driving circuit EDV, and extend toward the lower end of the display panel 100. The pads PD may be disposed in the non-display region 100-NDA adjacent to the lower end of the display panel 100, and may be more adjacent to the lower end of the display panel 100 than the driving chip DIC is. The pads PD may be connected to the driving chip DIC and some of the signal lines.

The scan driving circuit SDV may generate a plurality of scan signals, and the scan signals may be applied to the pixels PX through the scan lines SL1 to SLm. The driving chip DIC may generate a plurality of data voltages, and the data voltages may be applied to the pixels PX through the data lines DL1 to DLn. The emission driving circuit EDV may generate a plurality of emission signals, and the emission signals may be applied to the pixels PX through the emission lines EL1 to ELm. The pixels PX may receive the data voltages in response to the scan signals. In response to the emission signals, the pixels PX may emit light of brightness corresponding to the data voltages to display an image.

Figure 4A:
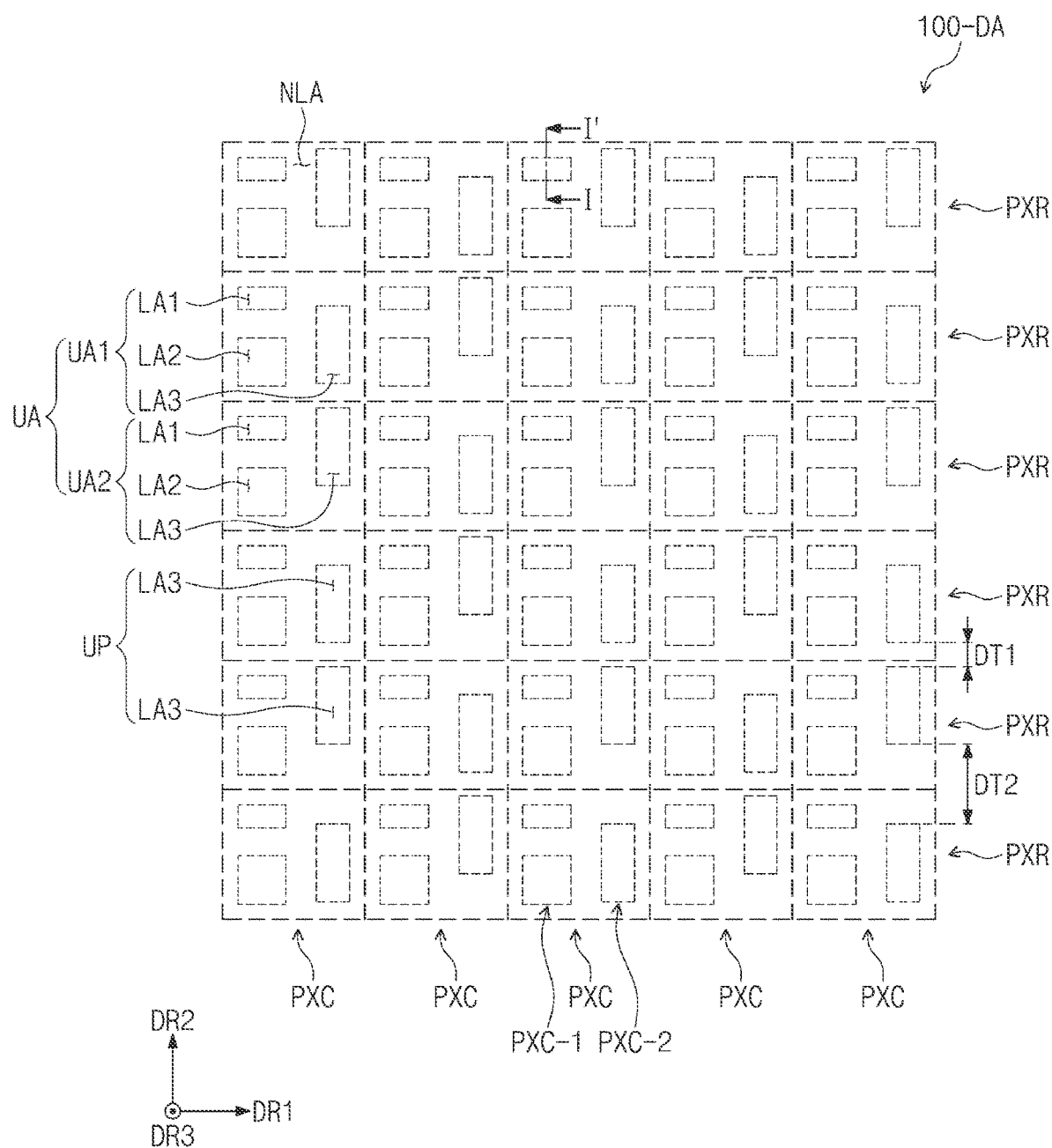
FIGS. 4A, 4B, and 4C are enlarged plan views of a display region according to an embodiment of the inventive concept.
Figure 4B:
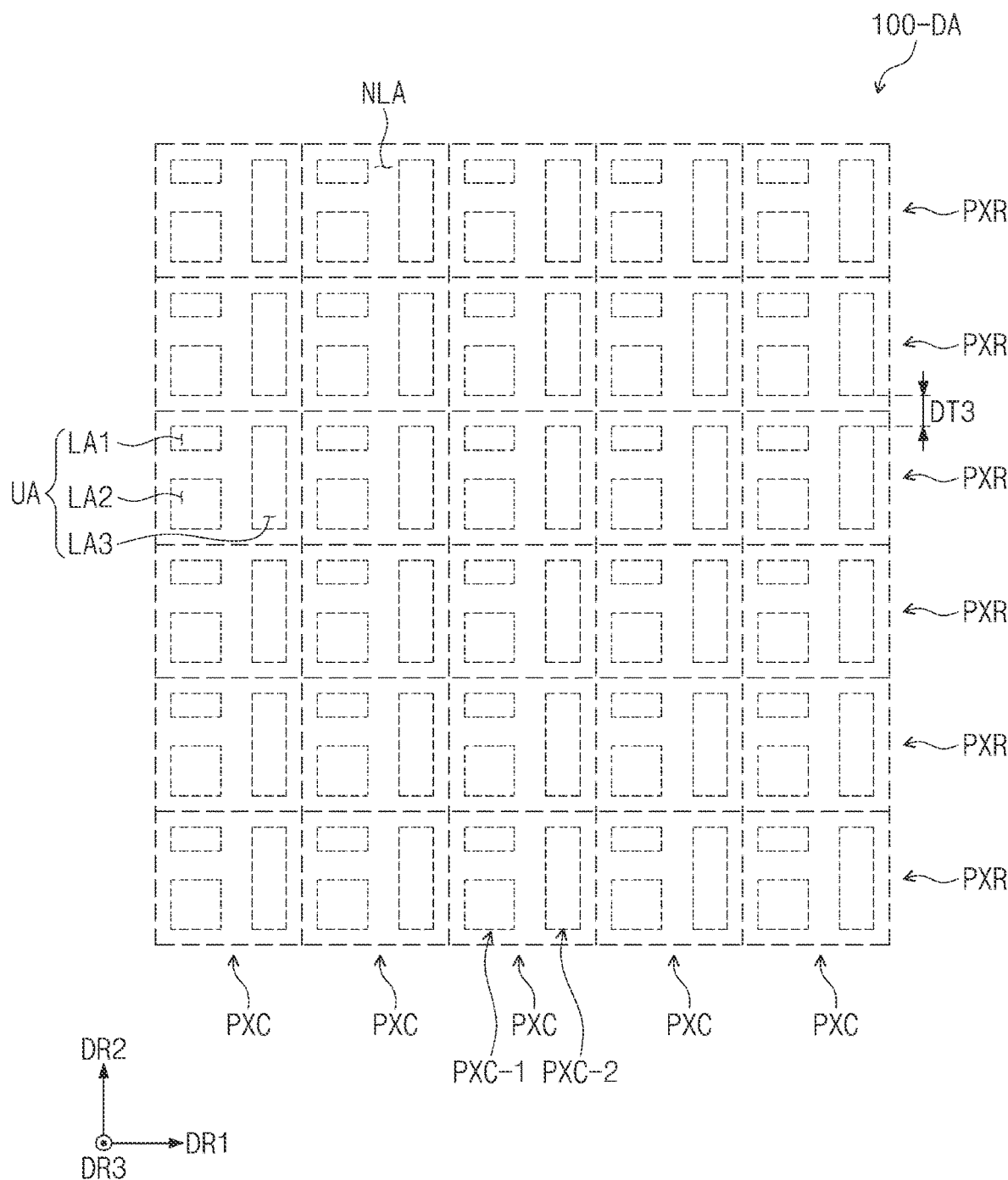
Figure 4C:
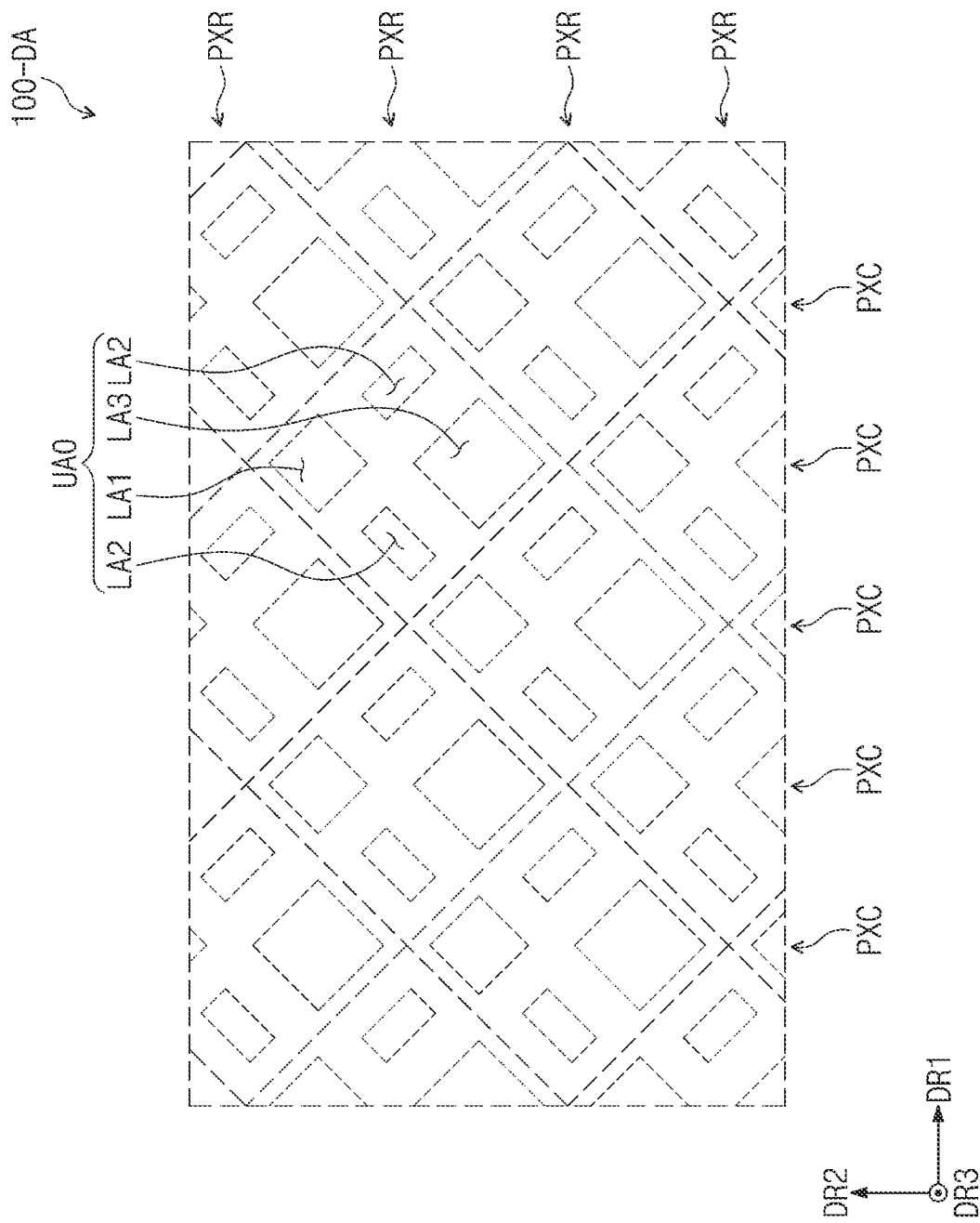

FIGS. 4A to 4C are enlarged plan views of a display region 100-DA according to an embodiment of the inventive concept.

Referring to FIG. 4A, the display region 100-DA may include a plurality of light-emitting regions LA1, LA2, and LA3, and a non-light-emitting region NLA adjacent to the plurality of light-emitting regions LA1, LA2, and LA3. The non-light-emitting region NLA set boundaries of the light-emitting regions LA1, LA2, and LA3.

The light-emitting regions LA1, LA2, and LA3 may be disposed respectively corresponding to the pixels PX in FIG. 3. The pixels PX may each include a light-emitting element, and the light-emitting regions LA1, LA2, and LA3 may be regions where light, formed in the light-emitting elements, is emitted. The arrangement relationship of the light-emitting regions LA1, LA2, and LA3 and the non-light-emitting region NLA will be described later with reference to FIG. 5.

The light-emitting regions LA1, LA2, and LA3 may include a first light-emitting region LA1 (or first color light-emitting region) that forms first color light, a second light-emitting region LA2 (or second color light-emitting region) that forms second color light, and a third light-emitting region LA3 (or third color light-emitting region) that forms third color light. In this embodiment, the first color light may be red color light, the second color light may be green color light, and the third color light may be blue color light.

The first light-emitting region LA1, the second light-emitting region LA2, and the third light-emitting region LA3 may have different areas, but an embodiment of the inventive concept is not limited thereto. In this embodiment, the area of the first light-emitting region LA1 may be the smallest, and the area of the third light-emitting region LA3 may be the largest.

The first light-emitting region LA1, the second light-emitting region LA2, and the third light-emitting region LA3 may define one unit light-emitting region UA. The unit light-emitting region UA is a repetitive arrangement unit of the light-emitting regions disposed in the display region 100-DA. In this embodiment, the unit light-emitting region UA may include a first unit light-emitting region UA1 and a second unit light-emitting region UA2.

In each of the first unit light-emitting region UA1 and the second unit light-emitting region UA2, the first light-emitting region LA1 and the second light-emitting region LA2 are disposed on one side of the third light-emitting region LA3 (left side in FIG. 4A) in a first direction DR1. In each of the first unit light-emitting region UA1 and the second unit light-emitting region UA2, the second light-emitting region LA2 is disposed on one side of the first light-emitting region LA1 (lower side in FIG. 4A) in the second direction DR2.

The first unit light-emitting region UA1 and the second unit light-emitting region UA2 have different positions of the third light-emitting region LA3 relative to the first light-emitting region LA1 and the second light-emitting region LA2 in a second direction DR2. Referring to the first unit light-emitting region UA1, the position of the third light-emitting region LA3, relative to the first light-emitting region LA1 and the second light-emitting region LA2, is disposed relatively on a lower side in the second direction DR2. Referring to the second unit light-emitting region UA2, the position of the third light-emitting region LA3, relative to the first light-emitting region LA1 and the second light-emitting region LA2, is disposed relatively on an upper side in the second direction DR2. The first unit light-emitting region UA1 and the second unit light-emitting region UA2 may have different shifted degrees of the third light-emitting region LA3 relative to the first light-emitting region LA1 and the second light-emitting region LA2 in the second direction DR2. In this embodiment, the third light-emitting region LA3 may be relatively more shifted in the second unit light-emitting region UA2. However, an embodiment of the inventive concept is not limited thereto, and the first unit light-emitting region UA1 and the second unit light-emitting region UA2 may have the same shifted degree of the third light-emitting region LA3 relative to the first light-emitting region LA1 and the second light-emitting region LA2 in the second direction DR2.

The first unit light-emitting region UA1 and the second unit light-emitting region UA2 may be alternately disposed along the first direction DR1 in a pixel row PXR. The first unit light-emitting region UA1 and the second unit light-emitting region UA2 are alternately disposed along the second direction DR2 in a pixel column PXC. Due to this arrangement of the first unit light-emitting region UA1 and the second unit light-emitting region UA2, the third light-emitting region LA3 in the first unit light-emitting region UA1 and the third light-emitting region LA3 in the second unit light-emitting region UA2 are arranged according to a predetermined rule. Adjacent two third light-emitting regions LA3 of the first unit light-emitting region UA1 and the second unit light-emitting region UA2, which are spaced apart from each other by a first distance DT1, are disposed relatively close to each other. The third light-emitting region LA3 of the first unit light-emitting region UA1 and the third light-emitting region LA3 of the second unit-light-emitting region UA2, which are spaced apart from each other by the first distance DT1, define a light-emitting region pair UP. The light-emitting region pairs UP are spaced apart from each other by a second distance DT2 in each of the pixel columns PXC. The second distance DT2 is larger than the first distance DT1.

The reason the light-emitting region pair UP is formed is because of a mask used during deposition. A light-emitting element disposed in the third light-emitting region LA3 of the first unit light-emitting region UA1 and a light-emitting element disposed in the third light-emitting region LA3 of the second unit light-emitting region UA2 include a light-emitting layer in an integrated form. That is, the light-emitting layer disposed in the third light-emitting region LA3 of the first unit light-emitting region UA1 and the light-emitting layer disposed in the third light-emitting region LA3 of the second unit light-emitting region UA2 have an integrated form, and are deposited using one mask. Openings corresponding to the light-emitting region pairs UP are defined on the mask. A region between the openings of the mask corresponds to a blocking region. Since the openings are defined corresponding to the light-emitting region pairs UP, the number of openings may be reduced, and thus the width of the blocking region of the mask, disposed between the openings in the second direction DR2, may be secured. By securing the width of the blocking region of the mask in the second direction DR2, it may be possible to suppress occurrence of defects that the thin-film mask is sagging during the deposition.

This may be seen when compared with a third distance DT3 between the third light-emitting regions LA3 illustrated in FIG. 4B. Referring to FIG. 4B, one type of unit light-emitting region UA is disposed in a display region 100-DA. The third distance DT3 between the third light-emitting regions LA3 of adjacent unit light-emitting regions UA in a pixel column is smaller than the second distance DT2 in FIG. 4A. A mask, which is used for forming the third light-emitting regions LA3 of FIG. 4B, has a larger number of openings, and thus the width of a blocking region of the mask is relatively reduced. This is because in the mask forming the light-emitting layers in the third light-emitting regions LA3 illustrated in FIG. 4B, the openings are defined respectively corresponding to the third light-emitting regions LA3.

Meanwhile, in each of FIG. 4A and FIG. 4B, the pixel column, where the first light-emitting regions LA1 and the second light-emitting regions LA2 are alternately disposed along the second direction DR2, may be referred to as a first unit pixel column PXC-1. The pixel column, where the third light-emitting regions LA3 are disposed along the second direction DR2, may be referred to as a second pixel column PXC-2.

Referring to FIG. 4C, one type of unit light-emitting region UA0 is disposed in a display region 100-DA. The unit light-emitting region UA0 includes second light-emitting regions LA2 disposed apart from each other in a first direction DR1, and a first light-emitting region LA1 and a third light-emitting region LA3 disposed apart from each other in a second direction DR2. The four light-emitting regions LA1, LA2, and LA3 of the unit light-emitting region UA0 are arranged in a diamond shape. The unit light-emitting regions UA0 in pixel rows PXR are arranged along the first direction DR1. The unit light-emitting regions UA0 in adjacent pixel rows PXR may be arranged in a staggered manner along the first direction DR1. The unit light-emitting regions UA0 in adjacent pixel columns PXC may be disposed in a staggered manner along the second direction DR2.

Figure 5:
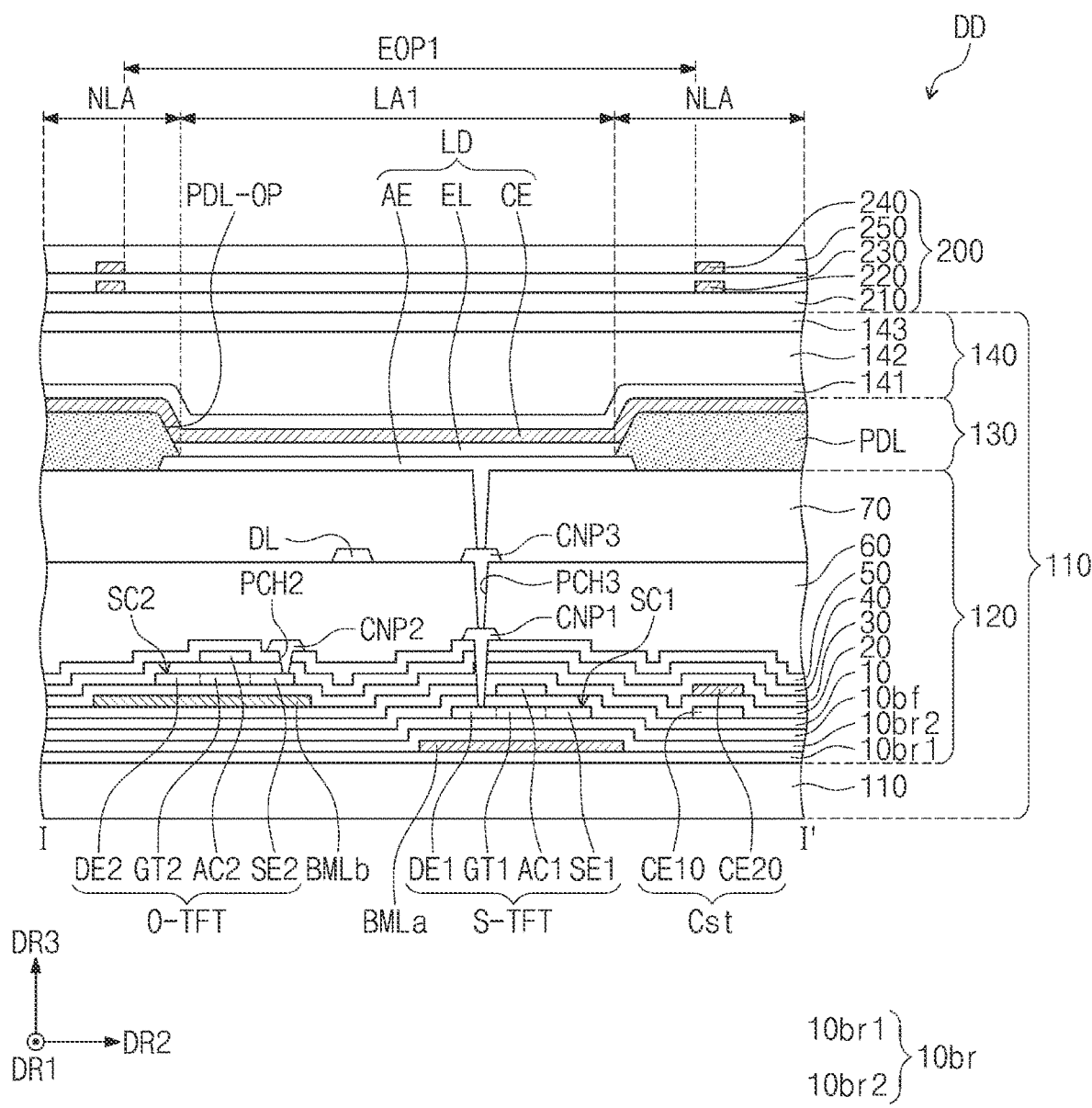
FIG. 5 is a cross-sectional view of a display device according to an embodiment of the inventive concept.

FIG. 5 is a cross-sectional view of a display device DD according to an embodiment of the inventive concept. FIG. 5 is a cross-sectional view of a display device DD taken along line I-I' of FIG. 4A. In FIG. 5, some components of the display device DD, for example, the anti-reflection layer 300, the adhesion layer PSA, and the window WM in FIG. 2 are not illustrated.

A pixel driving circuit that drives a light-emitting element LD may include a plurality of pixel driving elements. The pixel driving circuit may include a plurality of transistors S-TFT and O-TFT, and a capacitor Cst. FIG. 5 illustrates a silicon transistor S-TFT and an oxide transistor O-TFT as examples of the transistor. The pixel driving circuit PC in FIG. 5 is only an example, and the configuration of the pixel driving circuit PC is not necessarily limited thereto. The pixel driving circuit PC may also include only one type of transistor among the silicon transistor S-TFT and the oxide transistor O-TFT.

Referring to FIG. 5, a base layer 110 is illustrated as a single layer. The base layer 110 may include a synthetic resin such as polyimide. The base layer 110 may be formed by coating a synthetic resin layer on an operation substrate (or carrier substrate). The operation substrate may be removed when a display module DM is completed in the following process. According to an embodiment of the inventive concept, the base layer 110 may have a multi-layer structure including a first synthetic resin layer, at least one inorganic layer, and a second synthetic resin layer.

Referring to FIG. 5, a barrier layer 10br may be disposed on the base layer 110. The barrier layer 10br prevents foreign substances from entering from the outside. The barrier layer 10br may include at least one inorganic layer. The barrier layer 10br may include a silicon oxide layer and a silicon nitride layer. Each of these layers may be provided in plurality, and the silicon oxide layers and the silicon nitride layers may be alternately stacked.

The barrier layer 10br may include a lower barrier layer 10br1 and an upper barrier layer 10br2. A first shielding electrode BMLa may be disposed between the lower barrier layer 10br1 and the upper barrier layer 10br2. The first shielding electrode BMLa may be disposed to correspond to the silicon transistor S-TFT. The first shielding electrode BMLa may include metal, such as molybdenum.

The first shielding electrode BMLa may receive a bias voltage. The first shielding electrode BMLa may also receive a first power voltage. The first shielding electrode BMLa may prevent electrical potential caused by polarization from affecting the silicon transistor S-TFT. The first shielding electrode BMLa may prevent external light from reaching the silicon transistor S-TFT. According to an embodiment of the inventive concept, the first shielding electrode BMLa may be a floating electrode in the form of being isolated from another electrode or line.

A buffer layer 10bf may be disposed on the barrier layer 10br. The buffer layer 10bf may prevent metal atoms or impurities from being dispersed from the base layer 110 to a first semiconductor pattern SC1 thereabove. The buffer layer 10bf may include at least one inorganic layer. The buffer layer 10bf may include a silicon oxide layer and a silicon nitride layer.

The first semiconductor pattern SC1 may be disposed on the buffer layer 10bf. The first semiconductor pattern SC1 may include a silicon semiconductor. For example, the silicon semiconductor may include amorphous silicon, polycrystalline silicon, etc. For example, the first semiconductor pattern SC1 may include low temperature polysilicon.

The first semiconductor pattern SC1 may vary in electrical property according to whether it is doped or not. The first semiconductor pattern SC1 may include a first region with high conductivity and a second region with low conductivity. The first region may be doped with an N-type dopant or a P-type dopant. The second region may be an undoped region, or a doped region doped with lower concentration than that of the first region. A source region SE1, a channel region AC1 (or active region), and a drain region DE1 of the silicon transistor S-TFT may be formed from the first semiconductor pattern SC1. The source region SE1 and the drain region DE1 may extend in opposite directions from the channel region AC1 on a cross-section.

A first insulation layer 10 may be disposed on the buffer layer 10bf. The first insulation layer 10 may cover the first semiconductor pattern SC1. The first insulation layer 10 may be an inorganic layer. The first insulation layer 10 may be a single-layer silicon oxide layer. Not only the first insulation layer 10, but also an inorganic layer of a driving element layer 120, to be described later, may have a single-layer or multi-layer structure, and may include at least one of the above-mentioned materials, but an embodiment of the inventive concept is not limited thereto.

A gate GT1 of the silicon transistor S-TFT is disposed on the first insulation layer 10. The gate GT1 may be a portion of a metal pattern. The gate GT1 overlaps the channel region AC1. The gate GT1 may be a mask in a doping process of the first semiconductor pattern SC1. A first electrode CE10 of a storage capacitor Cst is disposed on the first insulation layer 10. Unlike what is illustrated in FIG. 5, the first electrode CE10 may have an integrated shape with the gate GT1.

A second insulation layer 20 may be disposed on the first insulation layer 10, and cover the gate GT1. According to an embodiment of the inventive concept, an upper electrode overlapping the gate GT1 may further be disposed on the second insulation layer 20. A second electrode CE20 overlapping the first electrode CE10 may be disposed on the second insulation layer 20. The upper electrode may also have an integrated shape with the second electrode CE20 on a plane.

A second shielding electrode BMLb is disposed on the second insulation layer 20. The second shielding electrode BMLb may be disposed to correspond to the oxide transistor O-TFT. According to an embodiment of the inventive concept, the second shielding electrode BMLb may also be omitted. According to an embodiment of the inventive concept, the first shielding electrode BMLa may extend to a lower part of the oxide transistor O-TFT to substitute for the second shielding electrode BMLb.

A third insulation layer 30 may be disposed on the second insulation layer 20. A second semiconductor pattern SC2 may be disposed on the third insulation layer 30. The second semiconductor pattern SC2 may include a channel region AC2 of the oxide transistor O-TFT. The second semiconductor pattern SC2 may include a metal oxide semiconductor. The second semiconductor pattern SC2 may include transparent conductive oxide (TCO) such as indium tin oxide (ITO), indium zinc oxide (IZO), indium gallium zinc oxide (IGZO), zinc oxide (ZnOx), or indium oxide (In2O3).

The metal oxide semiconductor may include a plurality of regions SE2, AC2, and DE2 divided according to whether the transparent conductive oxide is reduced or not. A region where the transparent conductive oxide is reduced (hereinafter, reduced region) has higher conductivity than a region where it is not (hereinafter, unreduced region). The reduced region substantially serves as a source/drain of the transistor, or a signal line. The unreduced region substantially corresponds to a semiconductor region (or channel) of the transistor. A fourth insulation layer 40 may be disposed on the third insulation layer 30. As illustrated in FIG. 5, the fourth insulation layer 40 may cover the second semiconductor pattern SC2. According to an embodiment of the inventive concept, the fourth insulation layer 40 may overlap a gate GT2 of the oxide transistor O-TFT, and may be an insulation pattern exposed by the source region SE2 and the drain region DE2 of the oxide transistor O-TFT.

The gate GT2 of the oxide transistor O-TFT is disposed on the fourth insulation layer 40. The gate GT2 of the oxide transistor O-TFT may be a portion of a metal pattern. The gate GT2 of the oxide transistor O-TFT overlaps the channel region AC2. A fifth insulation layer 50 may be disposed on the fourth insulation layer 40, and the fifth insulation layer 50 may cover the gate GT2. The first insulation layer 10 to the fifth insulation layer 50 may each be an inorganic layer.

A first connection pattern CNP1 and a second connection pattern CNP2 may be disposed on the fifth insulation layer 50. The first connection pattern CNP1 and the second connection pattern CNP2 may be formed through the same process, and may thus have the same material and the same stacked structure. The first connection pattern CNP1 may be connected to the drain region DE1 of the silicon transistor S-TFT through a first pixel contact hole PCH1 passing through the first to fifth insulation layers 10, 20, 30, 40, and 50. The second connection pattern CNP2 may be connected to the source region SE2 of the oxide transistor O-TFT through a second pixel contact hole PCH2 passing through the fourth and fifth insulation layers 40 and 50. The connection relationships of the first connection pattern CNP1 and the second connection pattern CNP2 to the silicon transistor S-TFT and the oxide transistor O-TFT are not necessarily limited thereto.

A sixth insulation layer 60 may be disposed on the fifth insulation layer 50. A third connection pattern CNP3 may be disposed on the sixth insulation layer 60. The third connection pattern CNP3 may be connected to the first connection pattern CNP1 through a third pixel contact hole PCH3 passing through the sixth insulation layer 60. A data line DL may be disposed on the sixth insulation layer 60. A seventh insulation layer 70 may be disposed on the sixth insulation layer 60, and cover the third connection pattern CNP3 and the data line DL. The third connection pattern CNP3 and the data line DL may be formed through the same process, and may thus have the same material and the same stacked structure. The sixth insulation layer 60 and the seventh insulation layer 70 may each be an organic layer.

A light-emitting element LD may include an anode AE (or first electrode), a light-emitting layer EL, and a cathode CE (or second electrode). The anode AE of the light-emitting element LD may be disposed on the seventh insulation layer 70. The anode AE may be a (semi-) transmissive electrode or a reflective electrode. The anode AE may include a stacked structure of ITO/Ag/ITO stacked in sequence. The positions of the anode AE and the cathode CE may be switched.

A pixel-defining film PDL may be disposed on the seventh insulation layer 70. The pixel-defining film PDL may be an organic layer. The pixel-defining film PDL may have light-absorbing characteristics, and for example, the pixel-defining film PDL may have the black color. The pixel-defining film PDL may include a black coloring agent. The black coloring agent may include a black pigment or black dye. The black coloring agent may include carbon black, metal such as chrome, or an oxide thereof. The pixel-defining film PDL may correspond to a light-blocking pattern having light-blocking characteristics.

The pixel-defining film PDL may cover a portion of the anode AE. For example, an opening PDL-OP, which exposes a portion of the anode AE, may be defined in the pixel-defining film PDL. A light-emitting region LA1 may be defined corresponding to the opening PDL-OP. FIG. 5 illustrates one light-emitting region LA1 corresponding to the first light-emitting region LA1 in FIG. 4A. A cross-section corresponding to the second light-emitting region LA2 and the third light-emitting region LA3 in FIG. 4A may also be substantially the same as a cross-section in FIG. 5. However, light-emitting layers EL having materials different from that of the first light-emitting region LA1 may be disposed in the second light-emitting region LA2 and the third light-emitting region LA3. In addition, referring to the light-emitting region pair UP in FIG. 4A, the pixel-defining film PDL is disposed between the third light-emitting region LA3 of the first unit light-emitting region UA1 and the third light-emitting region LA3 of the second unit light-emitting region UA2. The light-emitting layer EL disposed in the third light-emitting region LA3 of the first unit light-emitting region UA1 and the third light-emitting region LA3 of the second unit light-emitting region UA2 may be disposed on the pixel-defining film PDL disposed between the third light-emitting region LA3 of the first unit light-emitting region UA1 and the third light-emitting region LA3 of the second unit light-emitting region UA2.

According to an embodiment of the inventive concept, a hole control layer may be disposed between the anode AE and the light-emitting layer EL. The hole control layer may include a hole transport layer, and may further include a hole injection layer. An electron control layer may be disposed between the light-emitting layer EL and the cathode CE. The electron control layer may include an electron transport layer, and may further include an electron injection layer.

An encapsulation layer 140 may cover the light-emitting element LD. The encapsulation layer 140 may include an inorganic encapsulation layer 141, an organic encapsulation layer 142, and an inorganic encapsulation layer 143 stacked in sequence, but the layers constituting the encapsulation layer 140 are not necessarily limited thereto. The inorganic encapsulation layers 141 and 143 may include a silicon nitride layer, a silicon oxynitride layer, a silicon oxide layer, a titanium oxide layer, an aluminum oxide layer, or the like. The inorganic encapsulation layers 141 and 143 may each also have a multi-layer structure. The organic encapsulation layer 142 may include an acrylate-based organic layer, and an embodiment of the inventive concept is not limited thereto.

An input sensor 200 includes a plurality of conductive patterns. The input sensor 200 may include at least one conductive layer (or at least one sensor conductive layer) containing a plurality of conductive patterns, and at least one insulation layer (or at least one sensor insulation layer). In this embodiment, the input sensor 200 may include a first insulation layer 210 (or first sensor insulation layer), a first conductive layer 220 (or first sensor conductive layer), a second insulation layer 230 (or second sensor insulation layer), a second conductive layer 240 (or second sensor conductive layer), and a third insulation layer 250 (or third sensor insulation layer). FIG. 5 schematically illustrates the plurality of conductive patterns included in each of the first conductive layer 220 and the second conductive layer 240.

The first insulation layer 210 may be directly disposed on a display panel 100. The first insulation layer 210 may be an inorganic layer including at least any one of silicon nitride, silicon oxynitride, or silicon oxide. The first conductive layer 220 and the second conductive layer 240 may each have a single-layer structure, or a multi-layer structure stacked along a third direction DR3. The first conductive layer 220 and the second conductive layer 240 may include conductive lines defining an electrode in a mesh form. The conductive line of the first conductive layer 220 and the conductive line of the second conductive layer 240 may be connected to each other through a contact hole passing through the second insulation layer 230, or may not be connected, depending on the positions of the conductive lines. The first conductive layer 220 and the second conductive layer 240 may have a first opening EOP1 that corresponds to the first light-emitting region LA1.

The first conductive layer 220 and the second conductive layer 240, each having a single-layer structure, may each include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnOx), or indium zinc tin oxide (IZTO). In addition, the transparent conductive layer may include conductive polymer such as PEDOT, a metal nanowire, graphene, etc.

The first conductive layer 220 and the second conductive layer 240, each having a multi-layer structure, may each include metal layers. The metal layers may have a three-layer structure, for example, of titanium/aluminum/titanium. The multi-layer conductive layer may include at least one metal layer and at least one transparent conductive layer. The second insulation layer 230 may be disposed between the first conductive layer 220 and the second conductive layer 240. In this specification, the second insulation layer 230, disposed between the first conductive layer 220 and the second conductive layer 240, may be described as a "sensing insulation layer". The third insulation layer 250 may cover the second conductive layer 240. According to an embodiment of the inventive concept, the third insulation layer 250 may be omitted. The second insulation layer 230 and the third insulation layer 250 may each include an inorganic layer or an organic layer.

Figure 6B:
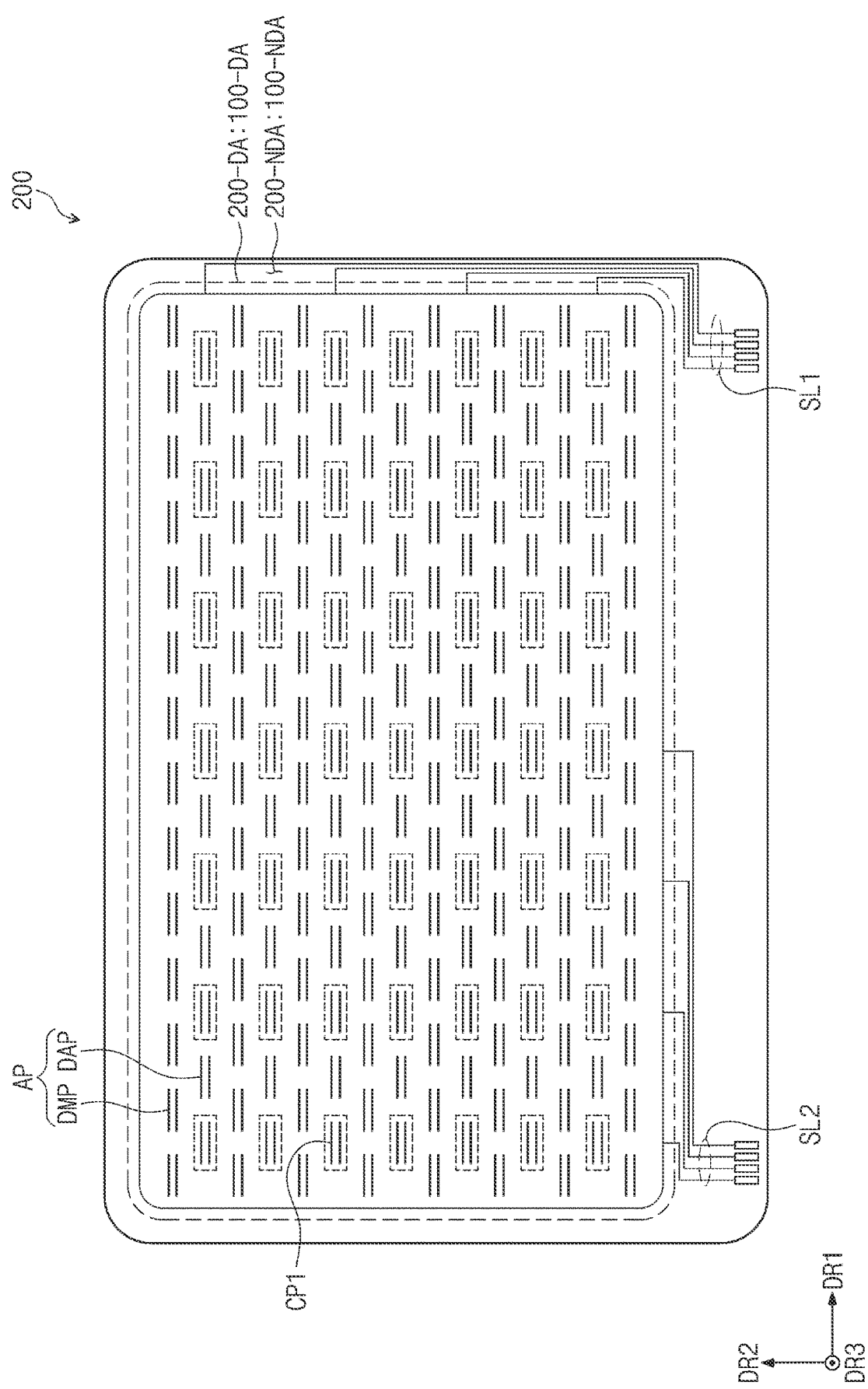

FIG. 6A is a plan view of an input sensor 200 according to an embodiment of the inventive concept. FIG. 6B is a plan view illustrating a partial configuration of an input sensor 200 according to an embodiment of the inventive concept. FIG. 6C is a plan view illustrating a partial configuration of an input sensor 200 according to an embodiment of the inventive concept. Each of FIGS. 6B and 6C separately illustrates conductive patterns disposed on different layers among a plurality of conductive patterns included in the input sensor 200 according to an embodiment of the inventive concept.

As illustrated in FIG. 6A, the input sensor 200 includes a sensing region 200-DA and a non-sensing region 200-NDA adjacent to the sensing region 200-DA. The sensing region 200-DA and the non-sensing region 200-NDA respectively correspond to the display region 100-DA and the non-display region 100-NDA illustrated in FIG. 5.

The input sensor 200 includes the plurality of conductive patterns, previously described. The plurality of conductive patterns include first electrodes SE1 (or first sensing electrodes), second electrodes SE2 (or second sensing electrodes), first signal lines SL1 (or first sensor signal lines), and second signal lines SL2 (or second sensor signal lines).

The first sensing electrodes SE1 and the second sensing electrodes SE2, which cross each other while insulated, are disposed in the sensing region 200-DA. In the non-sensing region 200-NDA, the first signal lines SL1, connected to the first sensing electrodes SE1, and the second signal lines SL2, electrically connected to the second sensing electrodes SE2, are disposed. Either of the first signal lines SL1 or the second signal lines SL2 transmit a driving signal for detecting an external input from an external circuit to corresponding electrodes, and the other one outputs a sensing signal. On the basis of the sensing signal, the change in capacitance is measured between the first sensing electrodes SE1 and the second sensing electrodes SE2. In this embodiment, a mutual capacitance type input sensor is exemplarily illustrated, but an embodiment of the inventive concept is not limited thereto. A self-capacitance type input senor may also be applied. The self-capacitance type input sensor may include one type of sensing electrodes.

The first sensing electrodes SE1 may be provided in a plurality of rows. The first sensing electrodes SE1 may include a first-row sensing electrode E1-1, a second-row sensing electrode E1-2, a third-row sensing electrode E1-3, and a fourth-row sensing electrode E1-4. Unlike what is illustrated in FIG. 6A, the first sensing electrodes SE1 may include two or three row sensing electrodes, or include at least five row sensing electrodes.

The second sensing electrodes SE2 may be provided in a plurality of columns. The second sensing electrodes SE2 may include a first-column sensing electrode E2-1, a second-column sensing electrode E2-2, a third-column sensing electrode E2-3, a fourth-column sensing electrode E2-4, a fifth-column sensing electrode E2-5, a sixth-column sensing electrode E2-6, and a seventh-column sensing electrode E2-7. Unlike what is illustrated in FIG. 6A, the second sensing electrodes SE2 may include six or fewer column sensing electrodes, or include at least eight column sensing electrodes.

The first sensing electrodes SE1 and the second sensing electrodes SE2 may each have a mesh form where a plurality of opening regions are defined. The plurality of opening regions may overlap, for example, corresponding light-emitting regions among the plurality of light-emitting regions LA1, LA2, and LA3 in FIG. 4A. The second sensing electrodes SE2 cross the first sensing electrodes SE1 while being insulated from each other. Either of the first sensing electrodes SE1 or the second sensing electrodes SE2 may have an integrated form. In this embodiment, the second sensing electrodes SE2 having an integrated form are exemplarily illustrated.

The second sensing electrodes SE2 may each include second sensing patterns SP2 and connection patterns CP2. The second sensing patterns SP2 may each have a larger area than each of the connection patterns CP2, and may each have a diamond shape. Each of the connection patterns CP2 is disposed between adjacent two second sensing patterns SP2 among the second sensing patterns SP2. The length of each of the connection patterns CP2 may be relatively small, and the connection patterns CP2 may also be omitted. At this time, the second sensing pattern SP2 may extend directly from an adjacent second sensing pattern SP2.

The first sensing electrodes SE1 may each include first sensing patterns SP1 and bridge patterns CP1. Adjacent two first sensing patterns SP1 may be connected by two bridge patterns CP1, but the number of the bridge patterns is not limited.

Referring to FIG. 6A, the input sensor 200 further includes an additional pattern AP. The additional pattern AP may include a plurality of dummy patterns DMP and a plurality of additional dummy patterns DAP. The additional pattern AP may be provided in plurality, and disposed in the entire sensing region 200-DA.

Each of the dummy patterns DMP may overlap each of the first sensing electrode SE1 and the second sensing electrode SE2 on a plane. Each of the dummy patterns DMP may overlap each of the first sensing pattern SP1 and the second sensing electrode SE2 on a plane. In the input sensor 200 according to an embodiment, a boundary part CTL may be defined between the first sensing electrode SE1 and the second sensing electrode SE2, and the dummy patterns DMP may overlap at least the boundary part CTL. Meanwhile, FIG. 6A illustrates that the dummy patterns DMP respectively overlap the boundary parts CTL between the first sensing patterns SP1 and the second sensing patterns SP2, but a plurality of dummy patterns DMP may overlap each of the boundary parts CTL between the first sensing pattern SP1 and the second sensing pattern SP2.

The additional dummy patterns DAP may overlap any one among the first sensing electrode SE1 and the second sensing electrode SE2, and may not overlap the other one. The additional dummy patterns DAP may overlap any one among the first sensing pattern SP1 and the second sensing pattern SP2, and may not overlap the other one. Meanwhile, FIG. 6A illustrates the additional dummy patterns DAP respectively overlap the first sensing patterns SP1 and the second sensing patterns SP2, but a plurality of additional dummy patterns DAP may overlap each of the first sensing pattern SP1 and the second sensing pattern SP2.

The bridge patterns CP1 and the additional patterns AP may have substantially the same shape on a plane. The bridge patterns CP1 and the additional patterns AP may have substantially the same length in a first direction DR1. The bridge patterns CP1, the dummy patterns DMP, and the additional dummy patterns DAP may have substantially the same length in the first direction DR1, and have substantially the same shape on a plane. Meanwhile, in this specification, "to be substantially the same" refers to having the same shape, length, and the like physically, and also includes the case of having a difference within a reference error that occurs during a process despite the same design.

The bridge patterns CP1 and the additional patterns AP may be disposed in the entire sensing region 200-DA, and disposed apart from each other at regular intervals. The bridge patterns CP1 and the additional patterns AP may be disposed apart from each other at regular intervals along each of the first direction DR1 and the second direction DR2 in the entire sensing region 200-DA. That is, when the distance between any one among the bridge patterns CP1 and any one adjacent thereto among the additional patterns AP, along each of the first direction DR1 and the second direction DR2, is defined as a first distance, and the distance between any one among the additional patterns AP and any one adjacent thereto among the additional patterns AP or the bridge patterns CP1, along each of the first direction DR1 and the second direction DR2, is defined as a second distance, the first distance and the second distance may be substantially the same.

Referring to FIGS. 6A to 6C, among the aforementioned plurality of conductive patterns, the bridge patterns CP1 and the additional patterns AP may be disposed on a first layer, and the second sensing electrodes SE2 and the first sensing patterns SP1 may be disposed on a second layer different from the first layer. For example, the bridge patterns CP1 and the additional patterns AP may be included in the first conductive layer 220 previously described with reference to FIG. 5 and disposed on the first insulation layer 210, and the second sensing electrodes SE2 and the first sensing patterns SP1 may be included in the second conductive layer 240 and disposed on the second insulation layer 230. Alternatively, the bridge patterns CP1 and the additional patterns AP may be included in the second conductive layer 240 and disposed on the second insulation layer 230, and the second sensing electrodes SE2 and the first sensing patterns SP1 may be included in the first conductive layer 220 and disposed on the first insulation layer 210.

The first signal lines SL1 and the second signal lines SL2 in FIG. 6A may each be formed from the first conductive layer 220 in FIG. 5. However, an embodiment of the inventive concept is not limited thereto, and the first signal lines SL1 and the second signal lines SL2 may each be formed also from the second conductive layer 240. The first signal lines SL1 and the second signal lines SL2 may each have a dual wiring structure including both the line formed from the first conductive layer 220 and the line formed from the second conductive layer 240.

Figure 7:
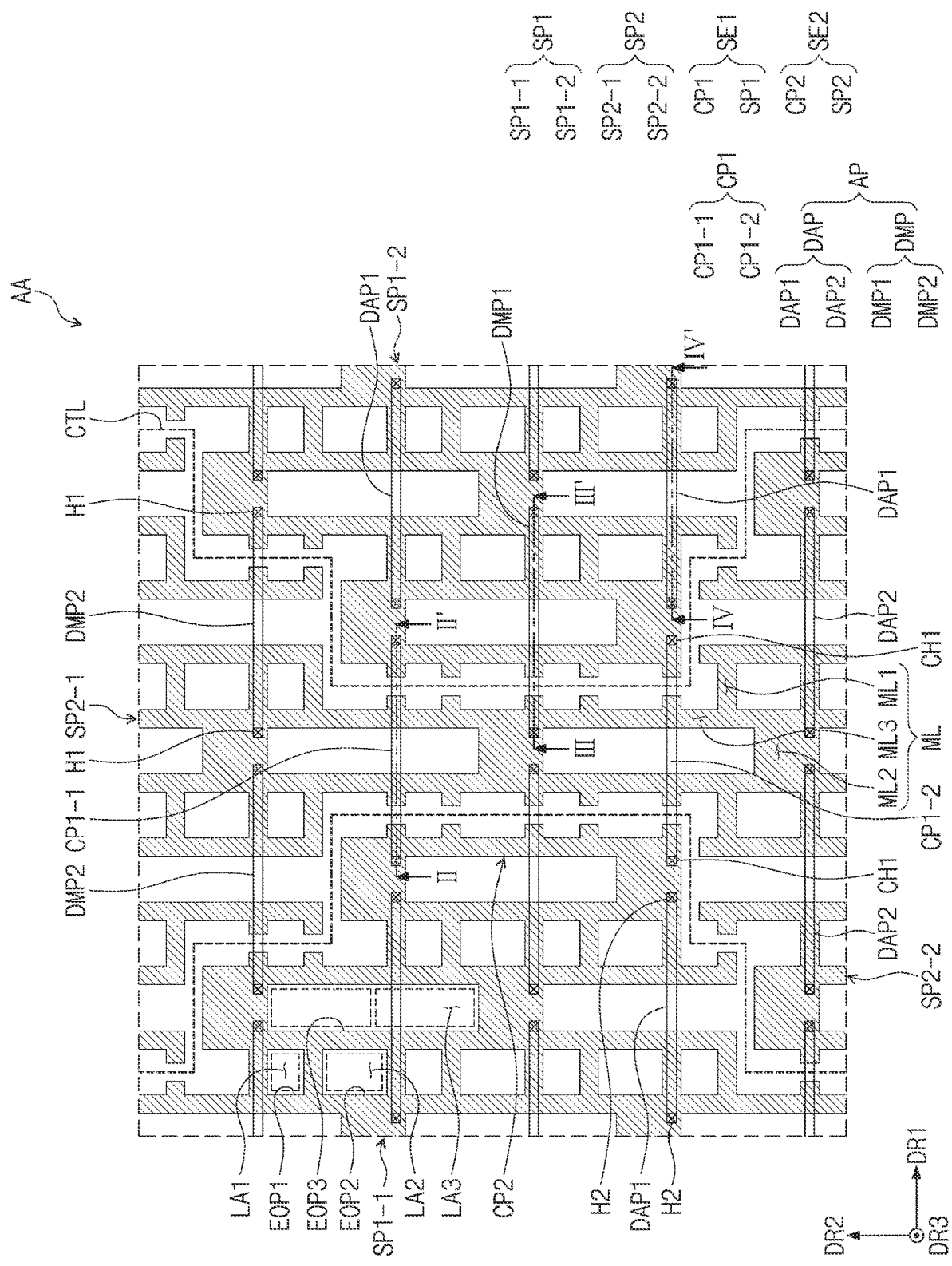
FIG. 7 is an enlarged plan view illustrating a portion of an input sensor according to an embodiment of the inventive concept.
Figure 8A:
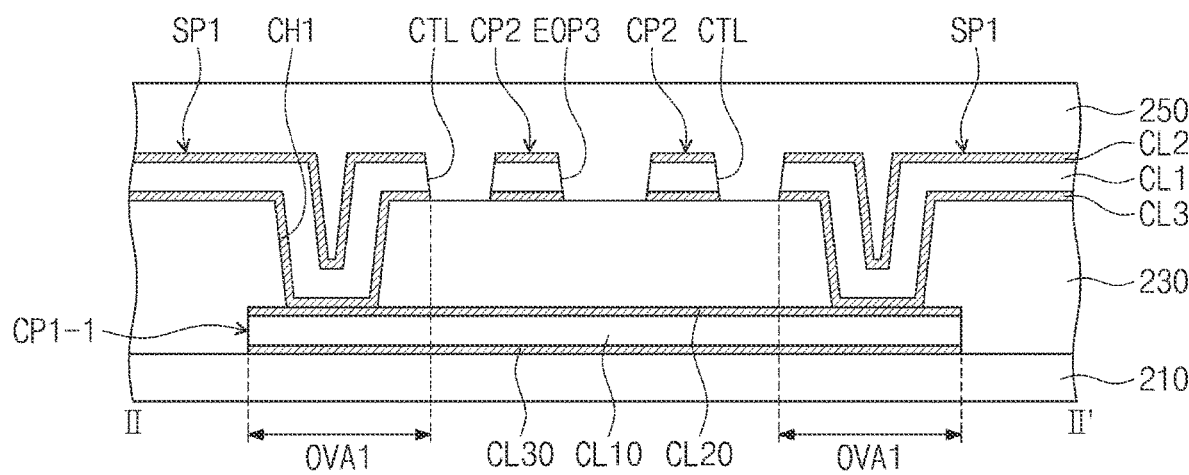
FIGS. 8A, 8B, and 8C are cross-sectional views illustrating a portion of an input sensor according to an embodiment of the inventive concept.
Figure 8B:
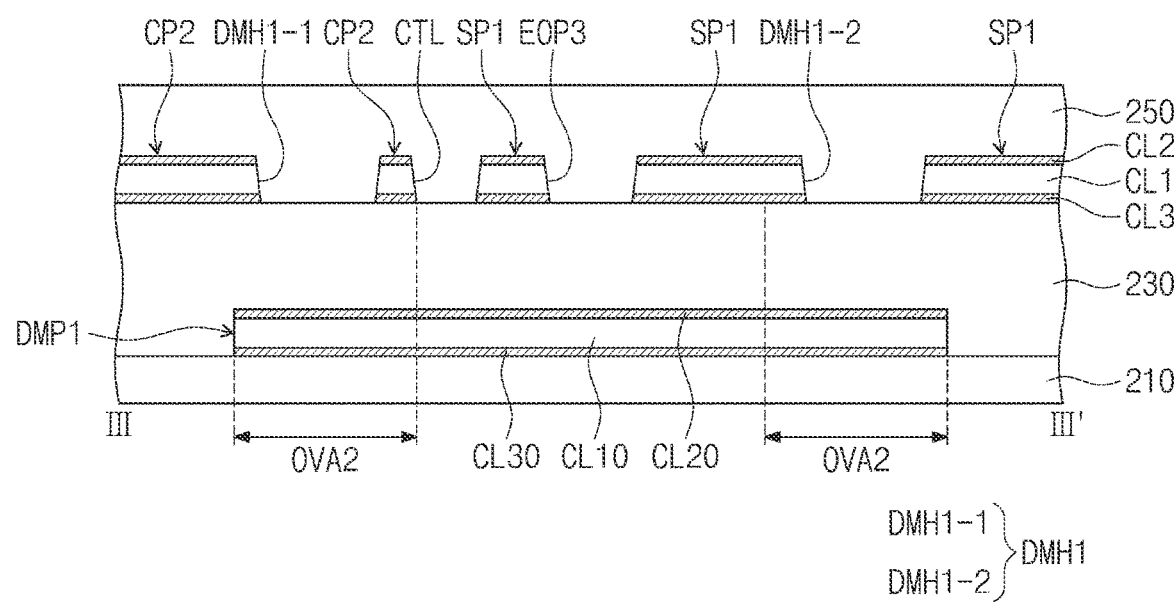
Figure 8C:
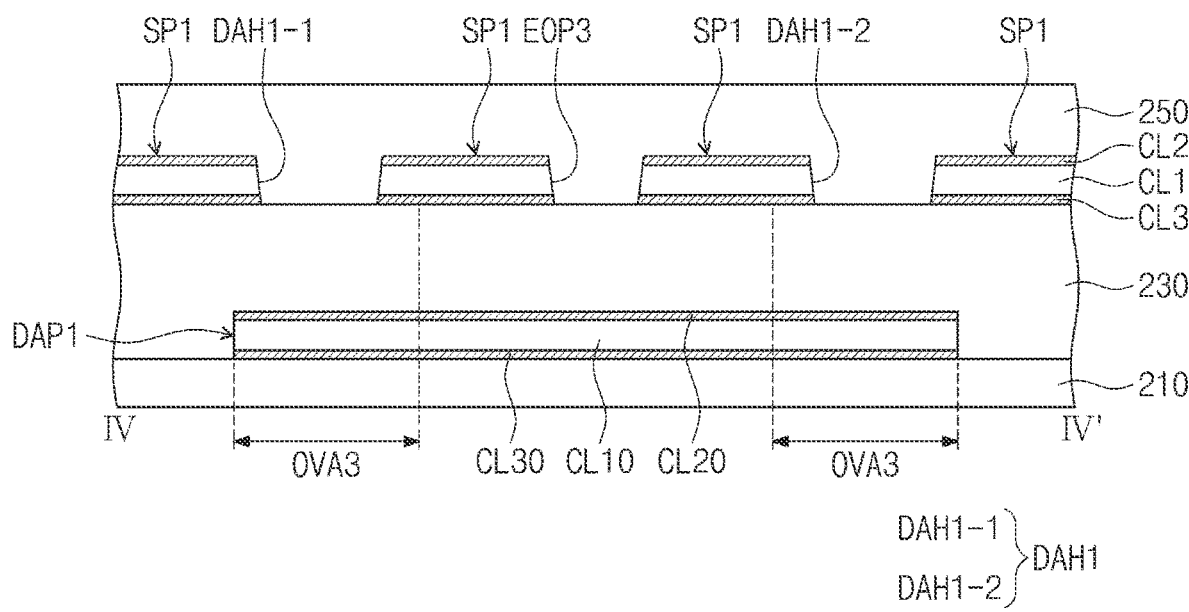

FIG. 7 is an enlarged plan view illustrating a portion of an input sensor according to an embodiment of the inventive concept. FIG. 7 illustrates an enlarged view of a portion corresponding to region AA illustrated in FIG. 6A. FIGS. 8A to 8C are cross-sectional views illustrating a portion of an input sensor according to an embodiment of the inventive concept. FIG. 8A illustrates a cross-section taken along line II-II' of FIG. 7. FIG. 8B illustrates a cross-section taken along line III-III' of FIG. 7. FIG. 8C illustrates a cross-section taken along line IV-IV' of FIG. 7.

Referring to FIGS. 6A and 7 together, the input sensor 200 includes a plurality of conductive patterns, and the plurality of conductive patterns include first sensing electrodes SE1 and second sensing electrodes SE2. The first sensing electrodes SE1 may include first sensing patterns SP1 and bridge patterns CP1. The second sensing electrodes SE2 may include second sensing patterns SP2 and connection patterns CP2. FIG. 7 exemplarily illustrates a (1-1)-th sensing pattern SP1-1, a (1-2)-th sensing pattern SP1-2, and a bridge pattern CP1 (or first bridge pattern) which are included in each of the first sensing electrodes SE1, and a (2-1)-th sensing pattern SP2-1 and a (2-2)-th sensing pattern SP2-2 included in each of the second sensing patterns SP2, and the connection pattern CP2.

A plurality of opening regions EOP1, EOP2, and EOP3 may be defined in each of the first sensing patterns SP1 and the second sensing patterns SP2. The plurality of opening regions EOP1, EOP2, and EOP3 may include a first opening region EOP1 corresponding to (or overlapping) a first light-emitting region LA1, a second opening region EOP2 corresponding to a second light-emitting region LA2, and a third opening region EOP3 corresponding to a third light-emitting region LA3. Meanwhile, a pixel column where the first light-emitting regions LA1 and the second light-emitting regions LA2 are alternately disposed along a second direction DR2 may be referred to as a first unit pixel column PXC-1. A pixel column where the third light-emitting regions LA3 are disposed along the second direction DR2 may be referred to as a second pixel column PXC-2.

In this embodiment, the first light-emitting region LA1 may be disposed inside the first opening region EOP1, the second light-emitting region LA2 may be disposed inside the second opening region EOP2, and the third light-emitting region LA3 may be disposed inside the third opening region EOP3. Inside the third opening region EOP3, two third light-emitting regions LA3 may be arranged along the second direction DR2 in common. Meanwhile, unlike what is illustrated in the drawing, only one third light-emitting region LA3 may also be disposed inside the third opening region EOP3.

The first sensing patterns SP1 and the second sensing patterns SP2 may each include a plurality of mesh lines ML defining the plurality of opening regions EOP1, EOP2, and EOP3. The plurality of mesh lines ML may include a first mesh line ML1 and a second mesh line ML2. The first mesh line ML1 and the second mesh line ML2 may each extend in the first direction DR1. The first mesh line ML1 may have a first thickness in the second direction DR2, and the second mesh line ML2 may have a second thickness larger than the first thickness in the second direction DR2. Meanwhile, the plurality of mesh lines ML may further include a third mesh line ML3 extending along the second direction DR2. The thickness of the third mesh line ML3 may be the same as the thickness of the first mesh line ML1. Meanwhile, the first mesh line ML1 may be a line component parallel to the first opening region EOP1 and the second opening region EOP2 in the second direction DR2, and the second mesh line ML2 may be a line component parallel to the third opening region EOP3 in the second direction DR2.

The plurality of opening regions EOP1, EOP2, and EOP3 may each have a larger planar area than the area of the light-emitting region overlapping therewith. For example, the planar area of the first opening region EOP1 may be larger than the area of the first light-emitting region LA1, the planar area of the second opening region EOP2 may be larger than the area of the second light-emitting region LA2, and the planar area of the third opening region EOP3 may be larger than the area of the third light-emitting region LA3. Accordingly, the plurality of mesh lines ML, which define the plurality of opening regions EOP1, EOP2, and EOP3, may not reduce the emission efficiency of light emitted through the light-emitting regions LA1, LA2, and LA3.

The arrangements and the shapes of the first to third mesh lines ML1, ML2, and ML3 may be variously changed according to the arrangements and the planar areas of the plurality of opening regions EOP1, EOP2, and EOP3 defined by the mesh lines ML. In addition, the arrangements and the planar areas of the plurality of opening regions EOP1, EOP2, and EOP3 may be variously changed according to the arrangements and the areas of the corresponding light-emitting regions LA1, LA2, and LA3.

Meanwhile, for the convenience of description, the first to third mesh lines ML1, ML2, and ML3 are described as separate lines, but the first to third mesh lines ML1, ML2, and ML3 may be connected to each other to have an integrated shape. That is, the first to third mesh lines ML1, ML2, and ML3 may be formed by patterning the plurality of opening regions EOP1, EOP2, and EOP3 on an integrated conductive layer.

In the input sensor 200 according to an embodiment, a boundary part CTL may be defined between the first sensing electrode SE1 and the second sensing electrode SE2. The boundary part CTL may be a portion where at least some of the mesh lines ML are removed. The boundary part CTL may be provided in order to insulate the first sensing electrode SE1 from the second sensing electrode SE2.

The second sensing patterns SP2 and the connection pattern CP2, included in the second sensing electrode SE2, may each include the mesh lines ML, and may have an integrated shape. The connection pattern CP2 may be disposed between adjacent two second sensing patterns SP2, and may have an integrated shape with each of the two second sensing patterns SP2. In FIG. 7, the (2-1)-th sensing pattern SP2-1, the (2-2)-th sensing pattern SP2-2, and the connection pattern CP2 may each include the mesh lines ML, and have an integrated shape.

The bridge pattern CP1 electrically connects adjacent two first sensing patterns SP1. The bridge pattern CP1 overlaps a first contact hole CH1 on a plane, and electrically connects the adjacent two first sensing patterns SP1 through the first contact hole CH1. The bridge pattern CP1 may connect the (1-1)-th sensing pattern SP1-1 to the (1-2)-th sensing pattern SP1-2 adjacent to each other.

The adjacent two first sensing patterns SP1 may be connected to each other by two bridge patterns CP1. The bridge pattern CP1 may include a (1-1)-th bridge pattern CP1-1 and a (1-2)-th bridge pattern CP1-2 connecting the (1-1)-th sensing pattern SP1-1 to the (1-2)-th sensing pattern SP1-2. The (1-1)-th bridge pattern CP1-1 and the (1-2)-th bridge pattern CP1-2 may be spaced apart from each other along the second direction DR2.

The bridge pattern CP1 may overlap two first contact holes CH1, and each of the two first contact holes CH1 may be provided to overlap the aforementioned second pixel column PXC-2. The first contact hole CH1 may be provided to overlap the third opening region EOP3 in the second direction DR2. The first contact hole CH1 may be provided to overlap the second mesh line ML2.

A dummy pattern DMP overlaps each of the first sensing electrode SE1 and the second sensing electrode SE2 on a plane. The dummy pattern DMP may overlap each of the first sensing pattern SP1 and the second sensing pattern SP2 on a plane. Alternatively, the dummy pattern DMP may overlap each of the first sensing pattern SP1 and the connection pattern CP2 on a plane. A portion of the dummy pattern DMP may overlap the boundary part CTL.

The dummy pattern DMP may include a first dummy pattern DMP1 disposed between the aforementioned (1-1)-th bridge pattern CP1-1 and (1-2)-th bridge pattern CP1-2. The first dummy pattern DMP1 may overlap each of the first sensing pattern SP1 and the connection pattern CP2 on a plane. The dummy pattern DMP may include a second dummy pattern DMP2 adjacent to any one among the (1-1)-th bridge pattern CP1-1 and the (1-2)-th bridge pattern CP1-2, and spaced apart from the other one. The second dummy pattern DMP2 may overlap each of the first sensing pattern SP1 and the second sensing pattern SP2 on a plane.

The bridge pattern CP1 is disposed between two dummy patterns DMP among the plurality of dummy patterns DMP in the second direction DR2, and the distances between the two dummy patterns DMP and the bridge pattern CP1, disposed between the two dummy patterns DMP, are uniform in the second direction DR2. That is, the bridge pattern CP1 may be disposed between the first dummy pattern DMP1 and the second dummy pattern DMP2 in the second direction DR2, and the distance from the first dummy pattern DMP1 to the bridge pattern CP1 in the second direction DR2 may be substantially the same as the distance from the second dummy pattern DMP2 to the bridge pattern CP1 in the second direction DR2.

The first dummy pattern DMP1 disposed between the (1-1)-th bridge pattern CP1-1 and the (1-2)-th bridge pattern CP1-2 may have a uniform distance from each of the (1-1)-th bridge pattern CP1-1 and the (1-2)-th bridge pattern CP1-2 in the second direction DR2. That is, the distance from the first dummy pattern DMP1 to the (1-1)-th bridge pattern CP1-1 in the second direction DR2 and the distance from the second dummy pattern DMP2 to the (1-2)-th bridge pattern CP1-2 in the second direction DR2 may be substantially the same.

In the input sensor 200 according to an embodiment, the distances between the plurality of dummy patterns DMP may be uniform. For example, as illustrated in FIG. 7, the distance between adjacent two first dummy patterns DMP1 and the distance between adjacent two second dummy patterns DMP2 may be the same as each other in the first direction DR1. In addition, with respect to the second direction DR2, the distance between the first dummy pattern DMP1 and the second dummy pattern DMP2 disposed thereabove and the distance between the first dummy pattern DMP1 and the second dummy pattern DMP2 disposed thereunder may be the same as each other.

In the input sensor 200 according to an embodiment, a first hole H1 may be provided to overlap the dummy pattern DMP. The first hole H1 may be provided to a portion where the dummy pattern DMP overlaps the first sensing pattern SP1 or the second sensing electrode SE2. The first hole H1 may be formed by a conductive pattern disposed on an upper part, among the first sensing pattern SP1 or the second sensing electrode SE2, and the dummy pattern DMP, being recessed in a third direction DR3 that is the thickness direction. The first hole H1 may be a dummy hole formed by a portion of the conductive pattern, disposed on the upper part, being removed, or may be a contact hole through which the conductive pattern disposed on the upper part is connected to a conductive pattern disposed on a lower part. The dummy patterns DMP may each overlap two first holes H1. Meanwhile, at least one dummy hole overlaps the dummy pattern DMP. The particular shapes of the dummy hole and the contact hole will be described later.

The first hole H1 may be provided to overlap the aforementioned second pixel column PXC-2. The first hole H1 may be provided to overlap the third opening region EOP3 in the second direction DR2. The first hole H1 may be provided to overlap the second mesh line ML2.

An additional dummy pattern DAP may overlap any one among the first sensing electrode SE1 and the second sensing electrode SE2, and may not overlap the other one. The additional dummy pattern DAP may overlap any one among the first sensing pattern SP1 and the second sensing pattern SP2, and may not overlap the other one. The additional dummy pattern DAP may include a first additional dummy pattern DAP1 overlapping the first sensing pattern SP1 and a second additional dummy pattern DAP2 overlapping the second sensing pattern SP2. Meanwhile, in this specification, the dummy pattern DMP and the additional dummy pattern DAP may be described as an additional pattern AP.

As previously described, the bridge pattern CP1 and the additional pattern AP may have substantially the same shape on a plane, and may be disposed apart from each other at regular intervals. As illustrated in FIG. 7, the bridge pattern CP1, the dummy pattern DMP, and the additional dummy pattern DAP may have substantially the same length in the first direction DR1. In addition, the distance between the bridge pattern CP1 and an adjacent different pattern, the distance between the dummy pattern DMP and an adjacent different pattern, and the distance between the additional dummy pattern DAP and an adjacent different pattern may be the same in each of the first direction DR1 and the second direction DR2. In an embodiment, the distance between adjacent two first dummy patterns DMP1 in the first direction DR1, the distance between adjacent two second dummy patterns DMP2 in the first direction DR1, and the distance between the bridge pattern CP1 and the first additional dummy pattern DAP1 adjacent to each other in the first direction DR1 may be the same as each other. In an embodiment, the distance between the first dummy pattern DMP1 and the bridge pattern CP1 adjacent to each other in the second direction DR2, the distance between the second dummy pattern DMP2 and the bridge pattern CP1 adjacent to each other in the second direction DR2, and the distance between the first dummy pattern DMP1 and the first additional dummy pattern DAP1 adjacent to each other in the second direction DR2 may be the same as each other.

In the input sensor 200 according to an embodiment, a second hole H2 may be provided to overlap the additional dummy pattern DAP. The second hole H2 may be provided to a portion where the additional dummy pattern DAP overlaps the first sensing pattern SP1 or the second sensing electrode SE2. The second hole H2 may be formed by a conductive pattern disposed on an upper part, among the first sensing pattern SP1 or the second sensing electrode SE2, and the additional dummy pattern DAP, being recessed in the third direction DR3 that is the thickness direction. The second hole H2 may be a dummy hole formed by a portion of the conductive pattern, disposed on the upper part, being removed, or may be a contact hole through which the conductive pattern disposed on the upper part is connected to a conductive pattern disposed on a lower part. Two second holes H2 may overlap each of the additional dummy patterns DAP.

The second hole H2 may be provided to overlap the aforementioned second pixel column PXC-2. The second hole H2 may be provided to overlap the third opening region EOP3 in the second direction DR2. The second hole H2 may be provided to overlap the second mesh line ML2.

Referring to FIGS. 7 and 8A to 8C together, the bridge pattern CP1 and the additional pattern AP may be disposed on a first layer, and the second sensing electrode SE2 and the first sensing pattern SP1 may be disposed on a second layer different from the first layer. The bridge pattern CP1 and the additional pattern AP may be included in the first conductive layer 220, previously described with reference to FIG. 5, and disposed on a first insulation layer 210, and the second sensing electrodes SE2 and the first sensing patterns SP1 may be included in the second conductive layer 240, previously described with reference to FIG. 5, and disposed on a second insulation layer 230.

Meanwhile, the first conductive layer 220 may include a first lower conductive layer CL10, a second lower conductive layer CL20 disposed on an upper side of the first lower conductive layer CL10 and in contact with the first lower conductive layer CL10, and a third lower conductive layer CL30 disposed on a lower side of the first lower conductive layer CL10 and in contact with the first lower conductive layer CL10. According to an embodiment of the inventive concept, the third lower conductive layer CL30 may be omitted. The first lower conductive layer CL10 has a first reflectance, a first conductivity, and a first thickness. The second lower conductive layer CL20 has a second reflectance lower than the first reflectance, a second conductivity lower than the first conductivity, and a second thickness smaller than the first thickness. The first lower conductive layer CL10 having low resistance corresponds to substantially a path through which signals travel. In the input sensor 200 according to an embodiment, by increasing the thickness through a three-layer structure, the plurality of conductive patterns may be disposed in a narrow area on a plane. The second lower conductive layer CL20 having a low reflectance covers the first lower conductive layer CL10, thereby reducing the reflectance for external light.

A second conductive layer 240 may include a first upper conductive layer CL1, a second upper conductive layer CL2 disposed on an upper side of the first upper conductive layer CL1 and in contact with the first upper conductive layer CL1, and a third upper conductive layer CL3 disposed on a lower side of the first upper conductive layer CL1 and in contact with the first upper conductive layer CL1. The first upper conductive layer CL1 of the second conductive layer 240 may include the same material and have the same thickness as the material and the thickness of the first lower conductive layer CL10 of the first conductive layer 220. The second upper conductive layer CL2 of the second conductive layer 240 may include the same material and have the same thickness as the material and the thickness of the second lower conductive layer CL20 of the first conductive layer 220. The third upper conductive layer CL3 of the second conductive layer 240 may include the same material and have the same thickness as the material and the thickness of the third lower conductive layer CL30 of the first conductive layer 220.

Referring to FIGS. 7 and 8A, when a region where the bridge pattern CP1-1 and the first sensing pattern SP1 overlap each other is defined as a first overlapping region OVA1, a first contact hole CH1 is defined in the first overlapping region OVA1, so that the bridge pattern CP1-1 and the first sensing pattern SP1 may be electrically connected to each other. The first contact hole CH1 may pass through the second insulation layer 230. The first sensing pattern SP1, disposed on an upper part, may be electrically connected to the bridge pattern CP1-1 by the first contact hole CH1.

Referring to FIGS. 7 and 8B, when a region where the dummy pattern DMP1 and the first sensing pattern SP1 overlap each other and a region where the dummy pattern DMP1 and the connection pattern CP2 overlap each other are defined as a second overlapping region OVA2, at least one dummy hole DMH1 is defined in the second overlapping region OVA2. A portion of a conductive pattern disposed on an upper part, that is, the first sensing pattern SP1 or the connection pattern CP2, may be removed to thereby provide the dummy hole DMH1. The dummy hole DMH1 may pass through the conductive pattern disposed on the upper part in the thickness direction to expose an upper surface of the second insulation layer 230. Meanwhile, in FIG. 8B, the first dummy pattern DMP1 overlapping each of the first sensing pattern SP1 and the connection pattern CP2 is illustrated as an example, but the same illustration may be applied to the second dummy pattern DMP2. That is, the dummy hole DMH1 may also be provided to each of the first sensing pattern SP1 and the second sensing pattern SP2 overlapping the second dummy pattern DMP2. The dummy hole DMH1 may correspond to the first hole H1 previously described.

One dummy pattern DMP1 may overlap two dummy holes DMH1. The dummy hole DMH1 may include a first dummy hole DMH1-1 and a second dummy hole DMH1-2. In an embodiment, the first dummy hole DMH1-1 may be provided to the second overlapping region OVA2 where the dummy pattern DMP1 overlaps the connection pattern CP2, and the second dummy hole DMH1-2 may be provided to the second overlapping region OVA2 where the dummy pattern DMP1 overlaps the first sensing pattern SP1.

Referring to FIGS. 7 and 8C, when a region where the additional dummy pattern DAP1 and the first sensing pattern SP1 overlap each other is defined as a third overlapping region OVA3, at least one additional dummy hole DAH1 may be defined in the third overlapping region OVA3. A portion of a conductive pattern disposed on an upper part, that is, the first sensing pattern SP1, may be removed to thereby provide the additional dummy hole DAH1. The additional dummy hole DAH1 may pass through the conductive pattern disposed on the upper part in the thickness direction to expose an upper surface of the second insulation layer 230. Meanwhile, in FIG. 8C, the first additional dummy pattern DAP1 overlapping the first sensing pattern SP1 is illustrated as an example, but the same illustration may be applied to the second additional dummy pattern DAP2. That is, the additional dummy hole DAH1 may also be provided to the second sensing pattern SP2 overlapping the second additional dummy pattern DAP2. The additional dummy hole DAH1 may correspond to the second hole H2 previously described.

One additional dummy pattern DAP1 may overlap two additional dummy holes DAH1. The additional dummy hole DAH1 may include a first additional dummy hole DAH1-1 and a second additional dummy hole DAH1-2. In an embodiment, the first additional dummy hole DAH1-1 may be provided to one of the third overlapping regions OVA3 where the additional dummy pattern DAP1 and the first sensing pattern SP1 overlap each other, and the second additional dummy hole DAH1-2 may be provided to the other one of the third overlapping regions OVA3.

Referring to FIGS. 7 and 8A to 8C together, the width of the first contact hole CH1 in the first direction DR1 and the width of each of the dummy hole DMH1 and the additional dummy hole DAH1 in the first direction DR1 may be designed to be similar with each other. Accordingly, the first contact hole CH1, the dummy hole DMH1, and the additional dummy hole DAH1 may have similar external light reflection characteristics.

In the input sensor 200 according to an embodiment, the first contact hole CH1, the first hole H1, and the second hole H2 may be disposed apart from each other at regular intervals. As illustrated in FIG. 7, the first contact hole CH1, the first hole H1, and the second hole H2 may be provided to ends of the bridge pattern CP1, ends of the dummy pattern DMP, and ends of the additional dummy pattern DAP, respectively, and may be arranged along the first direction DR1 and the second direction DR2 at regular intervals. That is, the first contact hole CH1, the dummy hole DMH1, and the additional dummy hole DAH1, respectively provided to the bridge pattern CP1, the dummy pattern DMP, and the additional dummy pattern DAP, may be arranged along the first direction DR1 and the second direction DR2 at regular intervals.

The input sensor according to an embodiment may further include an additional pattern at regular intervals in correspondence to the bridge pattern connecting the first sensing patterns, and thus, it may be possible to prevent defects that the bridge pattern is viewed from the outside. Since a portion where the bridge pattern and the first sensing patterns overlap each other is a portion where a two-layer conductive pattern is provided, the portion has a relatively higher reflectance than other portions, so that the portion where the bridge pattern and the first sensing patterns overlap may be brightly viewed from the outside if the input sensor only includes the bridge pattern but the additional pattern. In the input sensor according to an embodiment, since the additional patterns corresponding to the bridge pattern are provided to the entire sensing region, it may be possible to prevent the problem that the reflectance increases unusually only in the portion where the bridge pattern and the first sensing patterns overlap, and thereby preventing visibility defects that a portion is brightly viewed from the outside.

Meanwhile, in the input sensor according to an embodiment, the bridge pattern overlaps the first contact hole connected to the first sensing patterns. In contrast, when the first contact hole overlaps the dummy pattern overlapping each of the first sensing electrode and the second sensing electrode, among the additional patterns, it may cause a problem in which the first sensing electrode and the second sensing electrode are electrically connected to each other, so that the first contact hole may not overlap the dummy pattern. In the input sensor according to an embodiment, instead of the first contact hole, a dummy hole, passing through a conductive pattern disposed on an upper part in the thickness direction, is provided to overlap the dummy pattern. Since the dummy hole, having similar reflection characteristics with the first contact hole, is provided in the input sensor according to an embodiment, it may be possible to prevent defects that the first contact hole provided to overlap the bridge pattern is viewed from the outside, and therefore, the input sensor may have improved visibility. In addition, a display device including the input sensor may have improved visibility and reliability.

Figure 9A:
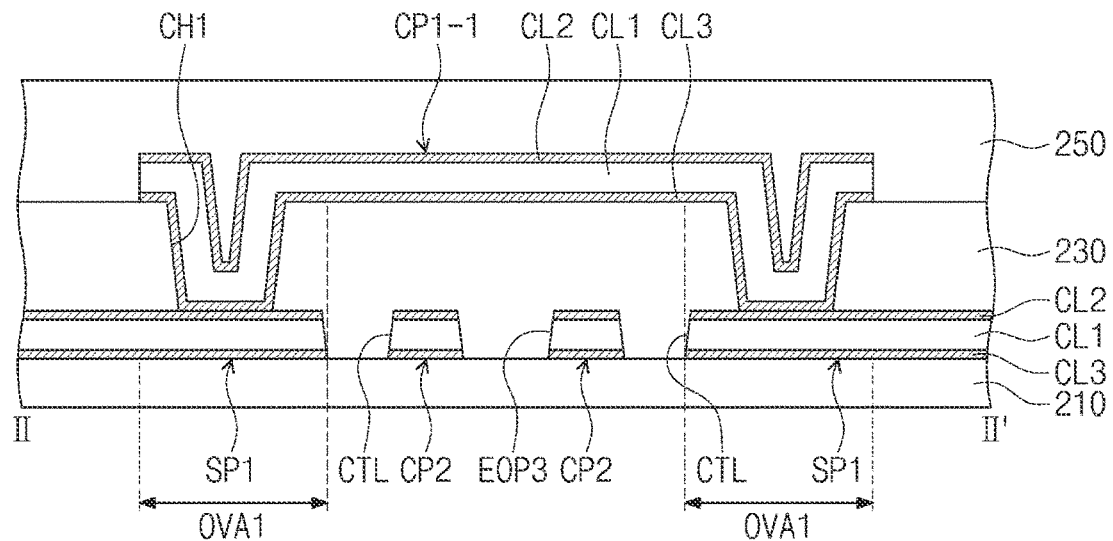
FIGS. 9A, 9B, and 9C are cross-sectional views illustrating a portion of an input sensor according to an embodiment of the inventive concept.
Figure 9B:
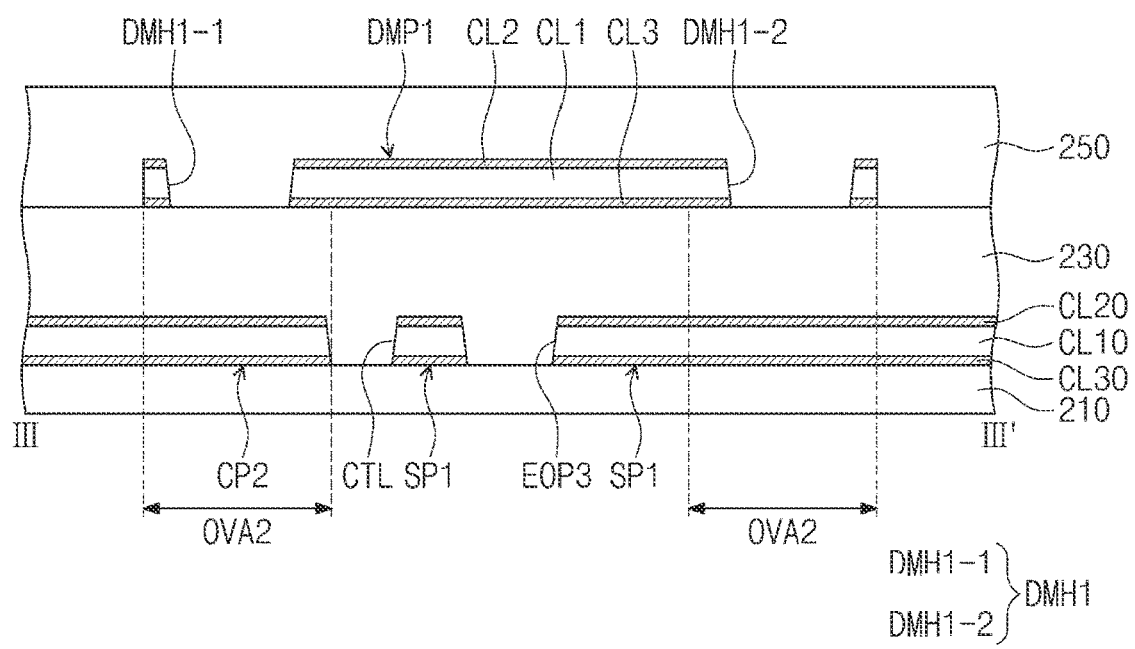
Figure 9C:
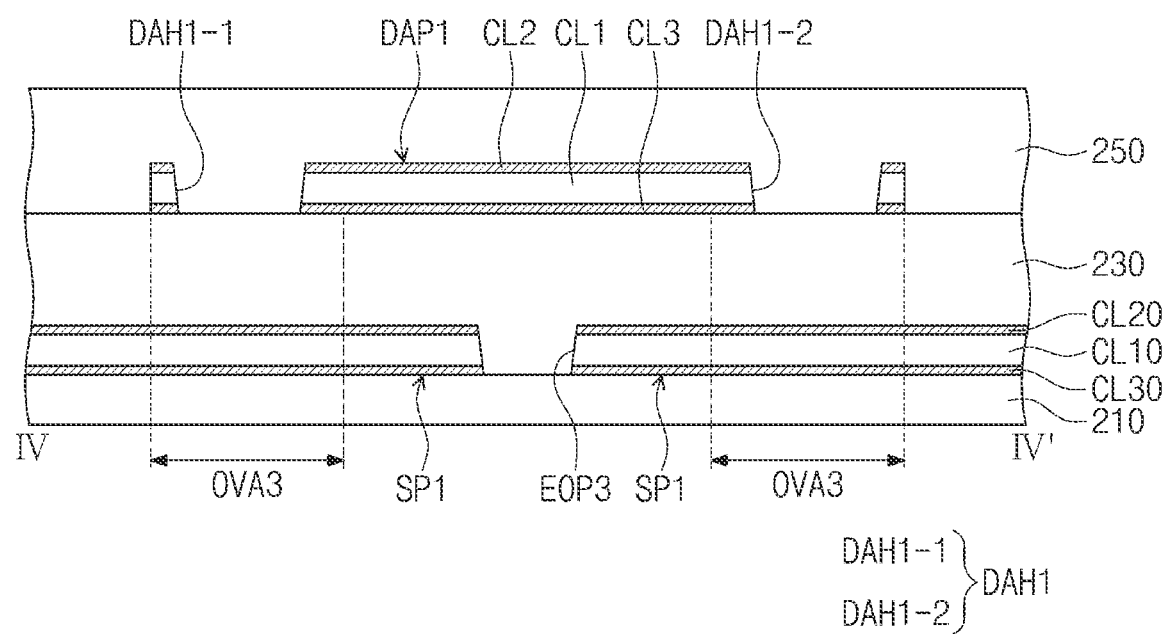

FIGS. 9A to 9C are cross-sectional views illustrating a portion of an input sensor according to an embodiment of the inventive concept. FIG. 9A illustrates a cross-section taken along line II-II' of FIG. 7. FIG. 9B illustrates a cross-section taken along line III-III' of FIG. 7. FIG. 9C illustrates a cross-section taken along line IV-IV' of FIG. 7. Meanwhile, FIGS. 9A to 9C are cross-sectional views illustrating a portion of an input sensor according to an embodiment different from the embodiment illustrated in FIGS. 8A to 8C.

Referring to FIGS. 7 and 9A to 9C together, a second sensing electrode SE2 and a first sensing pattern SP1 may be disposed on a first layer, and a bridge pattern CP1 and an additional pattern AP may be disposed on a second layer different from the first layer. The second sensing electrodes SE2 and the first sensing patterns SP1 may be included in the first conductive layer 220, previously described with reference to FIG. 5, and disposed on a first insulation layer 210, and the bridge pattern CP1 and the additional pattern AP may be included in the second conductive layer 240, previously described with reference to FIG. 5, and disposed on a second insulation layer 230.

Meanwhile, the first conductive layer 220 may include a first lower conductive layer CL10, a second lower conductive layer CL20 disposed on an upper side of the first lower conductive layer CL10 and in contact with the first lower conductive layer CL10, and a third lower conductive layer CL30 disposed on a lower side of the first lower conductive layer CL10 and in contact with the first lower conductive layer CL10. According to an embodiment of the inventive concept, the third lower conductive layer CL30 may be omitted. The first lower conductive layer CL10 has a first reflectance, a first conductivity, and a first thickness. The second lower conductive layer CL20 has a second reflectance lower than the first reflectance, a second conductivity lower than the first conductivity, and a second thickness smaller than the first thickness. The first lower conductive layer CL10 having low resistance corresponds to substantially a path through which signals travel. In the input sensor 200 according to an embodiment, by increasing the thickness through a three-layer structure, the plurality of conductive patterns may be disposed in a narrow area on a plane. The second lower conductive layer CL20 having a low reflectance covers the first lower conductive layer CL10, thereby reducing the reflectance for external light.

The second conductive layer 240 may include a first upper conductive layer CL1, a second upper conductive layer CL2 disposed on an upper side of the first upper conductive layer CL1 and in contact with the first upper conductive layer CL1, and a third upper conductive layer CL3 disposed on a lower side of the first upper conductive layer CL1 and in contact with the first upper conductive layer CL1. The first upper conductive layer CL1 of the second conductive layer 240 may include the same material and have the same thickness as the material and the thickness of the first lower conductive layer CL10 of the first conductive layer 220. The second upper conductive layer CL2 of the second conductive layer 240 may include the same material and have the same thickness as the material and the thickness of the second lower conductive layer CL20 of the first conductive layer 220. The third upper conductive layer CL3 of the second conductive layer 240 may include the same material and have the same thickness as the material and the thickness of the third lower conductive layer CL30 of the first conductive layer 220.

Referring to FIGS. 7 and 9A, when a region where a bridge pattern CP1-1 and the first sensing pattern SP1 overlap each other is defined as a first overlapping region OVA1, a first contact hole CH1 is defined in the first overlapping region OVA1, so that the bridge pattern CP1-1 and the first sensing pattern SP1 may be electrically connected to each other. The first contact hole CH1 may pass through the second insulation layer 230. The bridge pattern CP1-1 disposed on an upper part may be electrically connected to the first sensing pattern SP1 by the first contact hole CH1.

Referring to FIGS. 7 and 9B, when a region where a dummy pattern DMP1 and the first sensing pattern SP1 overlap each other and a region where the dummy pattern DMP1 and a connection pattern CP2 overlap each other are defined as a second overlapping region OVA2, at least one dummy hole DMH1 is defined in the second overlapping region OVA2. A portion of a conductive pattern disposed on an upper part, which is the dummy pattern DMP1, may be removed to thereby provide the dummy hole DMH1. The dummy hole DMH1 may pass through the conductive pattern, disposed on the upper part, in the thickness direction to expose an upper surface of the second insulation layer 230. Meanwhile, in FIG. 9B, the first dummy pattern DMP1 overlapping each of the first sensing pattern SP1 and the connection pattern CP2 is illustrated as an example, but the same illustration may be applied to a second dummy pattern DMP2. That is, the dummy hole DMH1 may also be provided to the second dummy pattern DMP2 overlapping each of the first sensing pattern SP1 and the second sensing pattern SP2. The dummy hole DMH1 may correspond to the first hole H1 previously described.

One dummy pattern DMP1 may overlap two dummy holes DMH1. The dummy hole DMH1 may include a first dummy hole DMH1-1 and a second dummy hole DMH1-2. In an embodiment, the first dummy hole DMH1-1 may be provided to the dummy pattern DMP1 disposed in the second overlapping region OVA2 where the dummy pattern DMP1 and the connection pattern CP2 overlap each other, and the second dummy hole DMH1-2 may be provided to the dummy pattern DMP1 disposed in the second overlapping region OVA2 where the dummy pattern DMP1 and the first sensing pattern SP1 overlap each other.

Referring to FIGS. 7 and 9C, when a region where an additional dummy pattern DAP1 and the first sensing pattern SP1 overlap each other is defined as a third overlapping region OVA3, at least one additional dummy hole DAH1 may be defined in the third overlapping region OVA3. A portion of a conductive pattern disposed on an upper part, which is the additional dummy pattern DAP1, may be removed to thereby provide the additional dummy hole DAH1. The additional dummy hole DAH1 may pass through the conductive pattern, disposed on the upper part, in the thickness direction to expose an upper surface of the second insulation layer 230. Meanwhile, in FIG. 9C, the first additional dummy pattern DAP1 overlapping the first sensing pattern SP1 is illustrated as an example, but the same illustration may be applied to a second additional dummy pattern DAP2. That is, the additional dummy hole DAH1 may also be provided to the second additional dummy pattern DAP2 overlapping the second sensing pattern SP2. The additional dummy hole DAH1 may correspond to the second hole H2 previously described.

One additional dummy pattern DAP1 may overlap two additional dummy holes DAH1. The additional dummy hole DAH1 may include a first additional dummy hole DAH1-1 and a second additional dummy hole DAH1-2. In an embodiment, the first additional dummy hole DAH1-1 may be provided to the additional dummy pattern DAP1 disposed on one of the third overlapping regions OVA3 where the additional dummy pattern DAP1 and the first sensing pattern SP1 overlap each other, and the second additional dummy hole DAH1-2 may be provided to the additional dummy pattern DAP1 disposed on the other one of the third overlapping regions OVA3.

Referring to FIGS. 7 and 9A to 9C together, the width of the first contact hole CH1 in the first direction DR1 and the width of each of the dummy hole DMH1 and the additional dummy hole DAH1 in the first direction DR1 may be designed to be similar with each other. Accordingly, the first contact hole CH1, the dummy hole DMH1, and the additional dummy hole DAH1 may have similar external light reflection characteristics.

Figure 10A:
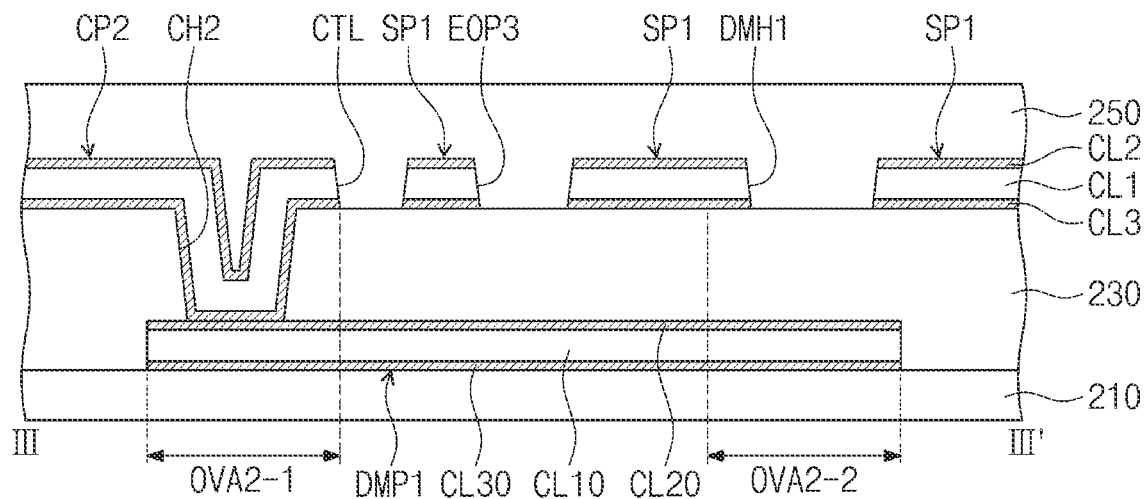
FIGS. 10A and 10B are cross-sectional views each illustrating a portion of an input sensor according to an embodiment of the inventive concept.
Figure 10B:
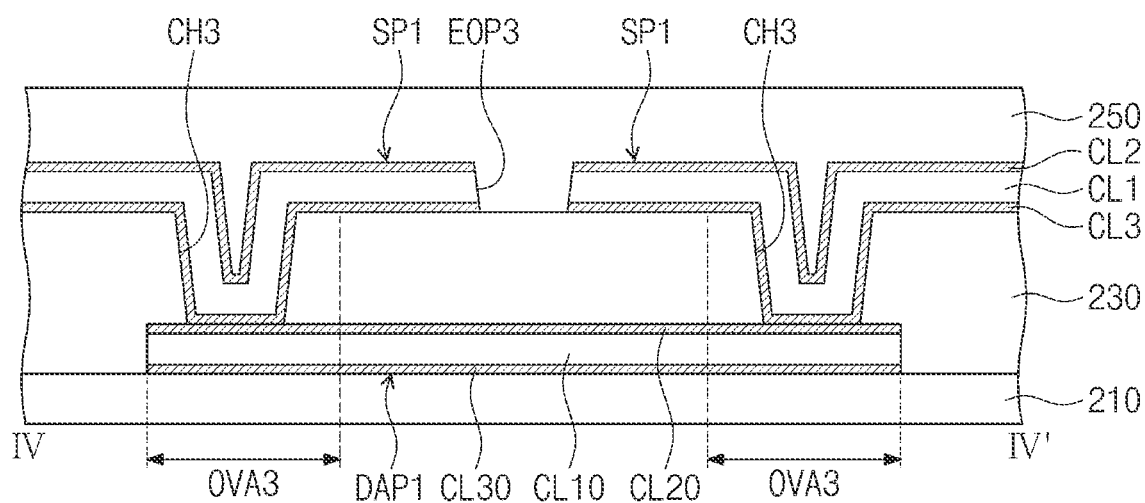

FIGS. 10A and 10B are cross-sectional views each illustrating a portion of an input sensor according to an embodiment of the inventive concept. FIG. 10A illustrates a cross-section taken along line III-III' of FIG. 7. FIG. 10B illustrates a cross-section taken along line IV-IV' of FIG. 7. Meanwhile, FIGS. 10A and 10B are cross-sectional views illustrating a portion of an input sensor according to an embodiment different from the embodiment illustrated in FIGS. 8B and 8C.

Referring to FIGS. 7 and 10A, when a region where a dummy pattern DMP1 and a first sensing pattern SP1 overlap each other and a region where the dummy pattern DMP1 and a connection pattern CP2 overlap each other are defined as a second overlapping region OVA2, at least one dummy hole DMH1 is defined in the second overlapping region OVA2. Meanwhile, one second contact hole CH2 may be provided to the second overlapping region OVA2. The dummy hole DMH1 may be provided to any one among the two second overlapping regions OVA2, and the second contact hole CH2 may be provided to the other one.

In an embodiment, since the second contact hole CH2 is provided to a (2-1)-th overlapping region OVA2-1 where the dummy pattern DMP1 and the connection pattern CP2 overlap each other, the dummy pattern DMP1 and the connection pattern CP2 may be connected to each other. The second contact hole CH2 may pass through a second insulation layer 230. The connection pattern CP2, disposed on an upper part, may be electrically connected to the dummy pattern DMP1 by the second contact hole CH2.

The dummy hole DMH1 may be provided to a (2-2)-th overlapping region OVA2-2 where the dummy pattern DMP1 and the first sensing pattern SP1 overlap each other. A portion of the conductive pattern disposed on an upper part, which is the first sensing pattern SP1, may be removed to thereby provide the dummy hole DMH. The dummy hole DMH1 may pass through the first sensing pattern SP1 in the thickness direction to expose an upper surface of the second insulation layer 230. In the input sensor 200 according to an embodiment, even though the second contact hole CH2 is provided to one among the two overlapping regions overlapping the dummy pattern DMP1, a short circuit problem, in which the first sensing electrode SE1 and the second sensing electrode SE2 are connected to each other, may not occur as the dummy hole DMH1 is provided to the other one.

Referring to FIGS. 7 and 10B, when a region where an additional dummy pattern DAP1 and the first sensing pattern SP1 overlap each other is defined as a third overlapping region OVA3, at least one third contact hole CH3 may be provided to the third overlapping region OVA3. Since the third contact hole CH3 is provided to the third overlapping region OVA3, the additional dummy pattern DAP1 and the first sensing pattern SP1 may be connected to each other. The third contact hole CH3 may pass through a second insulation layer 230. The first sensing pattern SP1, disposed on an upper part, may be electrically connected to the additional dummy pattern DAP1 by the third contact hole CH3. Since the first sensing pattern SP1 is electrically connected to the additional dummy pattern DAP1 by the third contact hole CH3, resistance of the first sensing pattern SP1 may be reduced. Meanwhile, FIG. 10B exemplarily illustrates that the third contact hole CH3 is provided to each of the two third overlapping regions OVA3, but the third contact hole CH3 may be provided only to any one among the third overlapping regions OVA3, and the additional dummy hole DAH1 (see FIG. 8C) may be provided to the other one.

Figure 11:
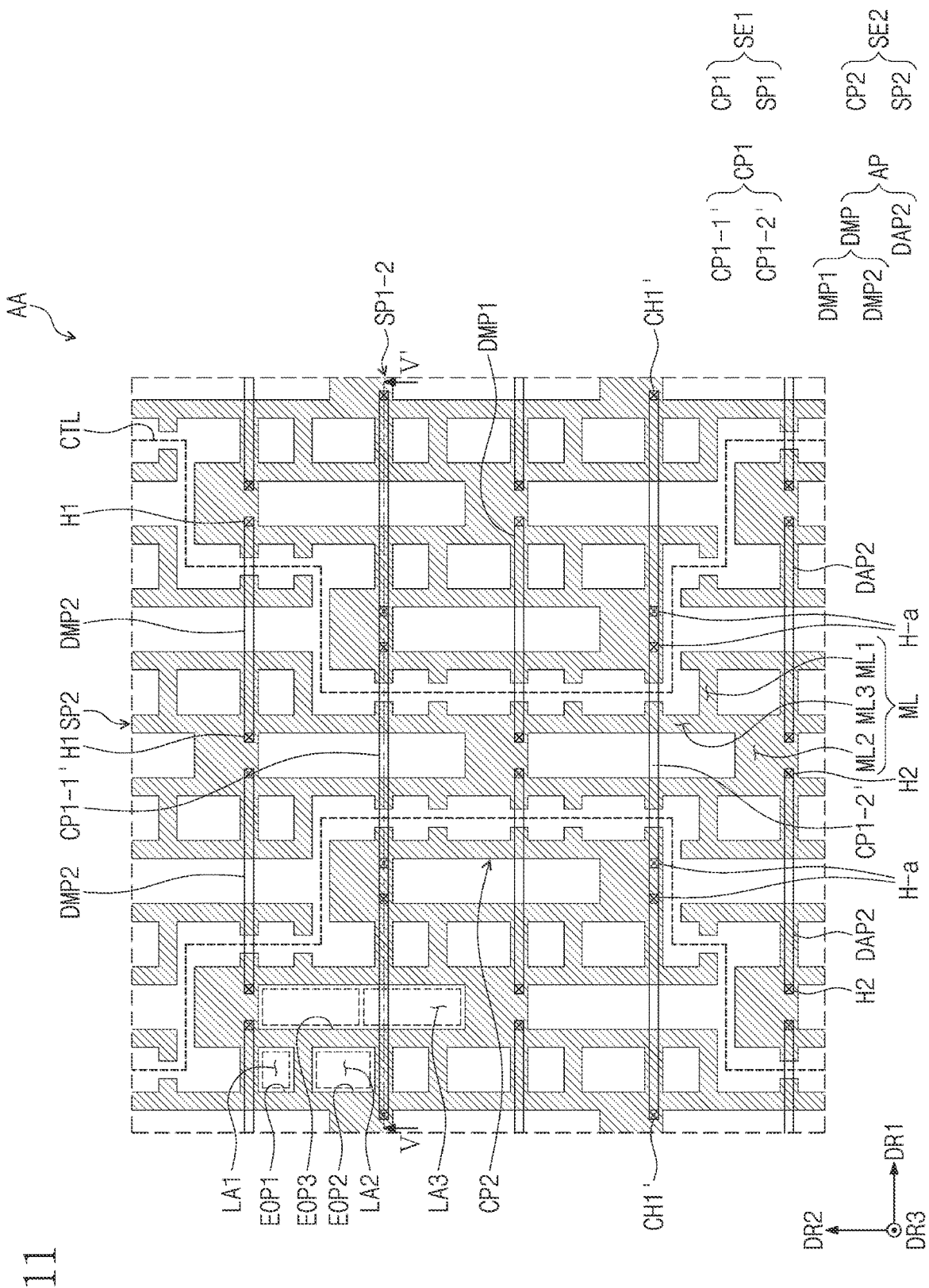
FIG. 11 is an enlarged plan view illustrating a portion of an input sensor according to an embodiment of the inventive concept.
Figure 12:
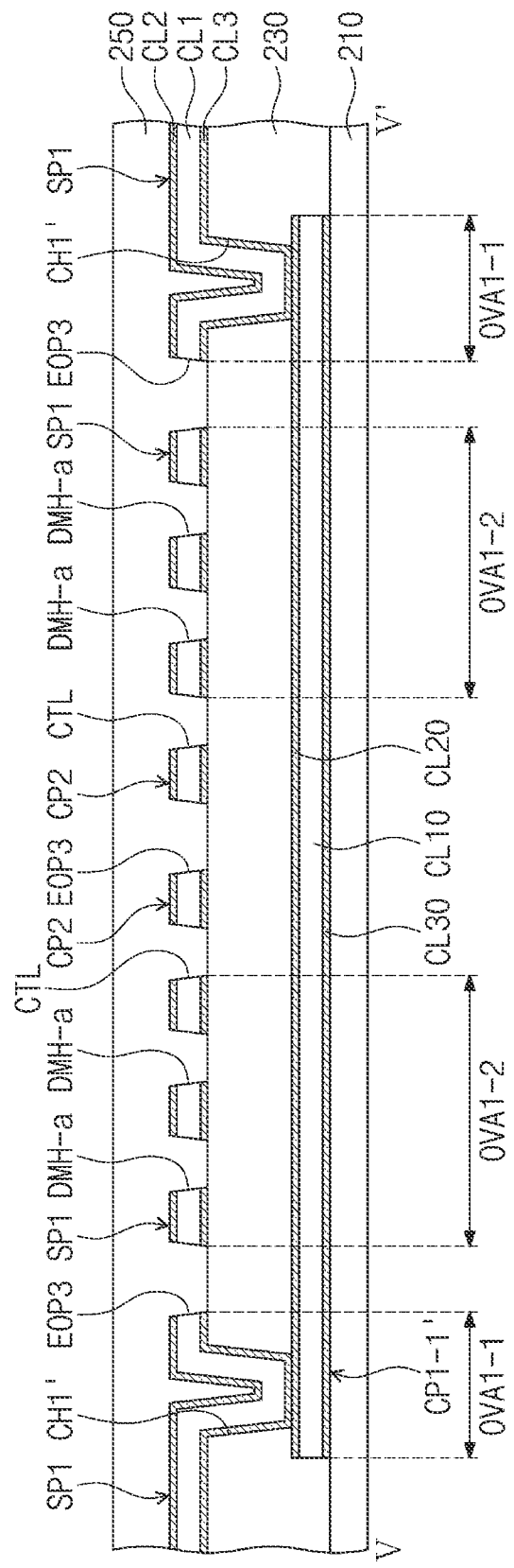
FIG. 12 is a cross-sectional view illustrating a portion of an input sensor according to an embodiment of the inventive concept.

FIG. 11 is an enlarged plan view illustrating a portion of an input sensor according to an embodiment of the inventive concept. FIG. 11 illustrates an enlarged view of a portion corresponding to region AA illustrated in FIG. 6A. Meanwhile, FIG. 11 illustrates a portion of an input sensor according to an embodiment different from the embodiment illustrated in FIG. 7. FIG. 12 is a cross-sectional view illustrating a portion of an input sensor according to an embodiment of the inventive concept. FIG. 12 illustrates a cross-section taken along line V-V' of FIG. 11.

Referring to FIGS. 11 and 12 together, unlike the embodiment illustrated in FIGS. 6A and 7, in an input sensor according to an embodiment, a bridge pattern CP1 and an additional pattern AP may have different lengths in a first direction DR1. In an embodiment, the bridge pattern CP1 may have a larger length than that of the additional pattern AP in the first direction DR1. When the length of the bridge pattern CP1 in the first direction DR1 is defined as a first length, and the length of the additional pattern AP in the first direction DR1 is defined as a second length, the first length may be larger than the second length. Meanwhile, the first length of the bridge pattern CP1 may be at least twice the second length of the additional pattern AP. A (1-1)-th bridge pattern CP1-1 and a (1-2)-th bridge pattern CP1-2 may each have a larger length than that of the additional pattern AP in the first direction DR1. A dummy pattern DMP and an additional dummy pattern DAP2 may have substantially the same length in the first direction DR1.

In the input sensor 200 according to an embodiment, the bridge pattern CP1 overlaps a first contact hole CH1' which is provided for the bridge pattern CP1 to be electrically connected to the first sensing pattern SP1, and also, an additional bridge hole H-a may be provided to overlap the bridge pattern CP1. The additional bridge hole H-a may be formed by a conductive pattern disposed on an upper part, among the first sensing pattern SP1 and the bridge pattern CP1, being recessed in a third direction DR3 that is the thickness direction. The additional bridge hole H-a may be a dummy hole formed by a portion of the conductive pattern, disposed on the upper part, being removed, or a contact hole through which the conductive pattern disposed on the upper part is connected to a conductive pattern disposed on a lower part. The bridge patterns CP1 may each overlap at least one additional bridge hole H-a. The additional bridge hole H-a may be provided to overlap the aforementioned second pixel column PXC-2. The additional bridge hole H-a may be provided to overlap a third opening region EOP3 in a second direction DR2. The additional bridge hole H-a may be provided to overlap a second mesh line ML2.

Referring to FIG. 12, the first contact hole CH1' may be provided to a (1-1)-th overlapping region OVA1-1 among first overlapping regions OVA1-1 and OVA1-2 where a bridge pattern CP1-1' and the first sensing pattern SP1 overlap each other, so that the bridge pattern CP1-1' and the first sensing pattern SP1 may be electrically connected. Meanwhile, at least one bridge dummy hole DMH-a may be provided to a (1-2)-th overlapping region OVA1-2 among the first overlapping regions OVA1-1 and OVA1-2. The bridge dummy hole DMH-a may correspond to the aforementioned additional bridge hole H-a.

A portion of a conductive pattern disposed on an upper part, which is the first sensing pattern SP1, may be removed to thereby provide the bridge dummy hole DMH-a. The bridge dummy hole DMH-a may pass through the conductive pattern, disposed on the upper part, in the thickness direction to expose an upper surface of a second insulation layer 230. Meanwhile, FIG. 12 exemplarily illustrates that the first sensing pattern SP1 is disposed on the upper part, but unlike what is illustrated in the drawing, when the bridge pattern CP1-1' is disposed above the first sensing pattern SP1, a portion of the bridge pattern CP1-1' may be removed to thereby provide the bridge dummy hole DMH-a. The bridge dummy hole DMH-a may have similar external light reflection characteristics with the first contact hole CH1'.

FIG. 12 exemplarily illustrates that only the plurality of bridge dummy holes DMH-a are provided to the (1-2)-th overlapping region OVA1-2, but at least a few among the bridge dummy holes DMH-a, provided to the (1-2)-th overlapping region OVA1-2, may be additional contact holes (not shown). That is, since the additional contact hole, instead of the bridge dummy hole DMH-a, is provided to the (1-2)-th overlapping region OVA1-2, the bridge pattern CP1-1' may be electrically connected to the first sensing pattern SP1 through the additional contact hole.

Embodiment of the inventive concept may prevent defects that a portion of conductive patterns of an input sensor included in a display device is unusually viewed from the outside, and thus, the input sensor including the conductive patterns and the display device may have improved visibility.

Although embodiments of the inventive concept have been described, it is understood that the inventive concept should not be limited to these embodiments but various changes and modifications can be made by one ordinary skilled in the art within the spirit and scope of the inventive concept as hereinafter claimed. Therefore, the scope of the inventive concept should not be limited to the contents described in the detailed description of the specification, but should be defined by the claims.

What is claimed is:

1. A display device comprising:
a display panel including a plurality of light-emitting regions; and
an input sensor disposed on the display panel and including a plurality of conductive patterns,
wherein the plurality of conductive patterns include:
a first sensing electrode including a plurality of first sensing patterns provided along a first direction and a plurality of bridge patterns connecting adjacent first sensing patterns;
a second sensing electrode spaced apart from the first sensing electrode and including a plurality of second sensing patterns extending along a second direction crossing the first direction; and
a plurality of dummy patterns each overlapping, on a plane, the second sensing electrode and a first sensing pattern adjacent to the second sensing electrode in the first direction, each of the plurality of bridge patterns is connected to two first sensing patterns through first contact holes, when a region, in which each of the plurality of dummy patterns overlaps each of the corresponding first sensing pattern and the second sensing electrode, is defined as an overlapping region, a dummy hole, which passes through a conductive pattern disposed on an upper part among the corresponding first sensing pattern, the second sensing electrode, and the plurality of dummy patterns, in a thickness direction, is defined in the overlapping region, each of the plurality of bridge patterns is disposed between two dummy patterns among the plurality of dummy patterns in the second direction, and distances between the two dummy patterns and the bridge pattern, disposed between the two dummy patterns, are uniform in the second direction.

2. The display device of claim 1, wherein the dummy hole comprises:
 a first dummy hole defined in a region where each of the plurality of dummy patterns overlaps the second sensing electrode; or
 a second dummy hole defined in a region where each of the plurality of dummy patterns overlaps the corresponding first sensing pattern.

3. The display device of claim 1, wherein each of the plurality of dummy patterns is connected, through a second contact hole, to any one not overlapping the dummy hole among the corresponding first sensing pattern and the second sensing electrode.

4. The display device of claim 1, wherein the plurality of conductive patterns further comprise at least one additional dummy pattern overlapping any one among the corresponding first sensing pattern and the second sensing electrode, and not overlapping the other one.

5. The display device of claim 4, wherein when a region, in which the additional dummy pattern overlaps any one among the corresponding first sensing pattern and the second sensing electrode, is defined as an additional overlapping region, an additional dummy hole, which passes through a conductive pattern disposed on an upper part, among the corresponding first sensing pattern, the second sensing electrode, and the additional dummy pattern, in a thickness direction, is defined in the additional overlapping region.

6. The display device of claim 5, wherein the first contact hole, the dummy hole, and the additional dummy hole are arranged at regular intervals in the first direction and the second direction.

7. The display device of claim 4, wherein the additional dummy pattern is electrically connected, through a third contact hole, to any one overlapping therewith among the corresponding first sensing pattern and the second sensing electrode.

8. The display device of claim 4, wherein a distance between two dummy patterns adjacent to each other in the first direction, among the plurality of dummy patterns, is substantially same as a distance between any one among the plurality of bridge patterns and the additional dummy pattern adjacent thereto in the first direction.

9. The display device of claim 1, wherein the plurality of bridge patterns comprise a first bridge pattern which connects a corresponding (1-1)-th sensing pattern and a (1-2)-th sensing pattern to each other, among the plurality of first sensing patterns, and
 the first bridge pattern includes:
  a (1-1)-th bridge pattern which connects the (1-1)-th sensing pattern to the (1-2)-th sensing pattern; and
  a (1-2)-th bridge pattern which is spaced apart from the (1-1)-th bridge pattern along the second direction, and connects the (1-1)-th sensing pattern to the (1-2)-th sensing pattern.

10. The display device of claim 9, wherein the plurality of dummy patterns comprise a first dummy pattern disposed between the (1-1)-th bridge pattern and the (1-2)-th bridge pattern in the second direction, and
 a distance between the (1-1)-th bridge pattern and the first dummy pattern in the second direction is substantially same as a distance between the (1-2)-th bridge pattern and the first dummy pattern in the second direction.

11. The display device of claim 1, wherein a boundary part is defined between the first sensing electrode and the second sensing electrode, and
 a portion of each of the plurality of dummy patterns overlaps the boundary part.

12. The display device of claim 1, wherein a length of each of the plurality of bridge patterns in the first direction is substantially same as a length of each of the plurality of dummy patterns in the first direction.

13. The display device of claim 1, wherein a first length of each of the plurality of bridge patterns in the first direction is larger than a second length of each of the plurality of dummy patterns in the first direction.

14. The display device of claim 1, wherein when a region, in which each of the plurality of bridge patterns overlaps each of the two first sensing patterns, is defined as a bridge overlapping region, a bridge dummy hole, which passes through a conductive pattern disposed on an upper part, among the two first sensing patterns and the plurality of bridge patterns, in a thickness direction, is defined in the bridge overlapping region.

15. The display device of claim 1, wherein the input sensor further comprises a sensing insulation layer disposed between the plurality of bridge patterns and the first sensing pattern, and the first contact hole passes through the sensing insulation layer.

16. The display device of claim 1, wherein the input sensor further comprises a sensing insulation layer disposed between the plurality of bridge patterns and the first sensing pattern, and
 the dummy hole exposes an upper surface of the sensing insulation layer.

17. The display device of claim 1, wherein each of the plurality of first sensing patterns and the plurality of second sensing patterns comprises a plurality of mesh lines defining a plurality of openings respectively overlapping the plurality of light-emitting regions,
 the plurality of mesh lines include:
  a first mesh line having a first thickness; and
  a second mesh line having a second thickness larger than the first thickness, and each of the first contact hole and the dummy hole overlaps the second mesh line.

18. The display device of claim 1, wherein the plurality of light-emitting regions comprise
 a first light-emitting region configured to emit first color light,
 a second light-emitting region configured to emit second color light different from the first color light, and
 a third light-emitting region configured to emit third color light different from the first color light and the second color light, the first light-emitting region and the second light-emitting region are alternately arranged along the second direction, the third light-emitting region is arranged apart from the first light-emitting region and the second light-emitting region along the first direction, and each of the first contact hole and the dummy hole overlaps the third light-emitting region in the second direction.

19. An electronic apparatus comprising:

a display panel including a plurality of light-emitting regions; and an input sensor disposed on the display panel, and including a plurality of conductive patterns, wherein the plurality of conductive patterns include:

a first sensing electrode including a plurality of first sensing patterns provided along a first direction, and a plurality of bridge patterns connecting adjacent first sensing patterns;

a second sensing electrode spaced apart from the first sensing electrode and including a plurality of second sensing patterns extending along a second direction crossing the first direction;

a plurality of dummy patterns each overlapping, on a plane, the second sensing electrode and a first sensing pattern adjacent to the second sensing electrode; and an additional dummy pattern overlapping the first sensing pattern or the second sensing electrode, each of the plurality of bridge patterns is connected to two first sensing patterns through first contact holes, when a region, in which each of the plurality of dummy patterns overlaps each of the corresponding first sensing pattern and the second sensing electrode, is defined as an overlapping region, a first hole, which passes through a conductive pattern disposed on an upper part among the corresponding first sensing pattern, the second sensing electrode, and the plurality of dummy patterns, being recessed in a thickness direction, is defined in the overlapping region, the first sensing pattern or the second sensing electrode includes second dummy holes that overlap the additional dummy pattern, and the first contact hole, the first hole, and the second holes are arranged at regular intervals in the first direction and the second direction.

20. An electronic apparatus comprising:

a display panel including a plurality of light-emitting regions; and an input sensor disposed on the display panel, and including a plurality of conductive patterns, wherein the plurality of conductive patterns include:

a first sensing electrode having a (1-1)-th sensing pattern and a (1-2)-th sensing pattern provided along a first direction, and a first bridge pattern connecting the (1-1)-th sensing pattern to the (1-2)-th sensing pattern;

a second sensing electrode spaced apart from the first sensing electrode, and having a (2-1)-th sensing pattern and a (2-2)-th sensing pattern provided along a second direction crossing the first direction, and a connection pattern having an integrated form with each of the (2-1)-th sensing pattern and the (2-2)-th sensing pattern; and a first dummy pattern overlapping each of the (1-1)-th sensing pattern and the connection pattern on a plane, the first bridge pattern is connected to each of the (1-1)-th sensing pattern and the (1-2)-th sensing pattern through first contact holes, and when a region, in which the first dummy pattern overlaps each of the (1-1)-th sensing pattern and the connection pattern, is defined as an overlapping region, the overlapping region includes a dummy hole passing through a conductive pattern disposed on an upper part, among the (1-1)-th sensing pattern, the connection pattern, and the first dummy pattern, in a thickness direction.

* * * * *